(12) United States Patent
Xu et al.

(10) Patent No.: US 10,425,539 B2
(45) Date of Patent: Sep. 24, 2019

(54) CHARGING METHOD, NETWORK DEVICE, AND BILLING SYSTEM

(71) Applicant: Huawei Technologies Co., Ltd., Shenzhen (CN)

(72) Inventors: Yaoqiang Xu, Beijing (CN); Guangwei He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/855,616

(22) Filed: Dec. 27, 2017

(65) Prior Publication Data
US 2018/0124253 A1 May 3, 2018

Related U.S. Application Data

(63) Continuation of application No. PCT/CN2015/082875, filed on Jun. 30, 2015.

(51) Int. Cl.
*H04M 11/00* (2006.01)
*H04M 15/00* (2006.01)
*H04W 4/24* (2018.01)

(52) U.S. Cl.
CPC .......... *H04M 15/65* (2013.01); *H04M 15/62* (2013.01); *H04M 15/64* (2013.01); *H04M 15/66* (2013.01); *H04W 4/24* (2013.01)

(58) Field of Classification Search
CPC ...... H04M 15/65; H04M 15/66; H04M 15/62; H04M 15/64; H04W 4/24

(Continued)

(56) References Cited

U.S. PATENT DOCUMENTS

2007/0124160 A1  5/2007  Duan et al.
2011/0098066 A1*  4/2011  Goermer ............... H04M 15/06
                                                                        455/466

(Continued)

FOREIGN PATENT DOCUMENTS

CN      1697390 A      11/2005
CN      1983940 A       6/2007

(Continued)

OTHER PUBLICATIONS

Foreign Communication From a Counterpart Application, European Application No. 15896773.7, Extended European Search Report dated May 16, 2018, 7 pages.

(Continued)

Primary Examiner — Marcos Batista
(74) Attorney, Agent, or Firm — Conley Rose, P.C.

(57) ABSTRACT

A charging method, a network device, and a system, where the method includes performing, by a policy and charging enforcement function (PCEF), online charging for user equipment (UE), switching, by the PCEF, the UE from online charging to offline charging, and starting an offline timer when an online charging system (OCS) is unavailable, and restoring, by the PCEF, the UE from offline charging to online charging when the PCEF learns, before the offline timer expires, that the OCS becomes available. Hence, after a user is switched to offline charging, an online charging function can be recovered in a timely manner when the OCS becomes available. In this way, a user account overdraft risk possibly existing in an offline charging process is mitigated, and deactivation of the user can be avoided in the solutions, thereby improving user experience.

10 Claims, 11 Drawing Sheets

(58) Field of Classification Search
USPC .......................................... 455/406; 370/338
See application file for complete search history.

(56) References Cited

U.S. PATENT DOCUMENTS

| | | | |
|---|---|---|---|
| 2011/0270722 A1* | 11/2011 | Cai | .................... G06Q 30/0283 |
| | | | 705/34 |
| 2014/0011512 A1 | 1/2014 | Hu et al. | |

FOREIGN PATENT DOCUMENTS

| | | |
|---|---|---|
| CN | 102132550 A | 7/2011 |
| CN | 102612011 A | 7/2012 |
| CN | 102647697 A | 8/2012 |
| CN | 102884757 A | 1/2013 |
| EP | 1746772 A1 | 1/2007 |
| JP | 2013527962 A | 7/2013 |
| JP | 2014507082 A | 3/2014 |
| WO | 2014130446 A1 | 8/2014 |

OTHER PUBLICATIONS

Huawei, et al., "Credit management session failure reporting by PCEF," SA WG2 Meeting #99, S2-133613, Sep. 23-27, 2013, 5 pages.
Foreign Communication From a Counterpart Application, Japanese Application No. 2017-565904, Japanese Notice of Reasons for Rejection dated Dec. 11, 2018, 2 pages.
Foreign Communication From a Counterpart Application, Japanese Application No. 2017-565904, English Translation of Japanese Notice of Reasons for Rejection dated Dec. 11, 2018, 3 pages.
Machine Translation and Abstract of Chinese Publication No. CN102612011, Jul. 25, 2012, 22 pages.
Machine Translation and Abstract of Chinese Publication No. CN102647697, Aug. 22, 2012, 15 pages.
Foreign Communication From a Counterpart Application, PCT Application No. PCT/CN2015/082875, English Translation of International Search Report dated Mar. 29, 2016, 2 pages.
Foreign Communication From a Counterpart Application, PCT Application No. PCT/CN2015/082875, English Translation of Written Opinion dated Mar. 29, 2016, 7 pages.
Machine Translation and Abstract of Chinese Publication No. CN1983940, Jun. 20, 2007, 37 pages.
Machine Translation and Abstract of Chinese Publication No. CN102132550, Jul. 20, 2011, 19 pages.
Machine Translation and Abstract of Chinese Publication No. CN102884757, Jan. 16, 2013, 17 pages.
Foreign Communication From a Counterpart Application, Chinese Application No. 201580026907.8, Chinese Office Action dated Mar. 12, 2019, 10 pages.

* cited by examiner

CHARGING METHOD, NETWORK DEVICE, AND BILLING SYSTEM

CROSS-REFERENCE TO RELATED APPLICATION

This application is a continuation of International Patent Application No. PCT/CN2015/082875 filed on Jun. 30, 2015, which is hereby incorporated by reference in its entirety.

TECHNICAL FIELD

The present disclosure relates to the field of mobile communications, and in particular, to a charging method, a network device, and a billing system (BS).

BACKGROUND

In a telecommunications network described by the $3^{rd}$ Generation Partnership Project (3GPP), a BS is one of the important functional components of the telecommunications network and is an important guarantee for revenues of an operator.

As defined in the 3GPP protocol, when an online charging system (OCS) is unavailable, a user may be switched to offline charging, thereby ensuring continuing use of a service, improving user experience, and avoiding a loss to the operator. To avoid an account overdraft caused when the user who is switched to offline charging uses the service for a long time, a holding timer is usually used to set duration for offline charging. The user is deactivated after timeout. If the OCS has recovered when the user goes online again, online charging is recovered, or if the OCS has not recovered, offline charging is continued. After the user is switched to offline charging, a generated charging data record carries a switched-to-offline flag. The BS may eventually perform complementary fee deduction on the charging data record carrying the switched-to-offline flag.

In other approaches, there are no online charging auto-recovery mechanism in a process from a time at which the user is switched to offline charging to a time at which the user is deactivated. Consequently, online charging is not recovered in a timely manner. This increases a probability of an account overdraft caused when the user who has been switched to offline charging continues to use the service. If an overdraft cannot be reclaimed, a loss may be caused to the operator. In addition, the user is deactivated after timeout of the holding timer, and the service is interrupted during reactivation of the user. This affects user experience.

SUMMARY

Embodiments of the present disclosure provide a charging method, a network device, and a BS in order to mitigate a user account overdraft risk and improve user experience.

According to a first aspect, an embodiment of the present disclosure provides a charging method, including performing, by a policy and charging enforcement function (PCEF), online charging for user equipment (UE), learning, by the PCEF, that an OCS is unavailable, switching, by the PCEF, the UE from online charging to offline charging, and starting an offline timer, where the offline timer is configured to indicate a maximum time from offline charging to deactivation for the UE, and restoring, by the PCEF, the UE from offline charging to online charging if the PCEF learns, before the offline timer expires, that the OCS becomes available.

With reference to the first aspect, in a first possible implementation of the first aspect, that the PCEF learns that the OCS becomes available includes sending, by the PCEF, a request message to the OCS, and receiving, by the PCEF, a success response message sent by the OCS, where the success response message is a response to the request message, and is used to indicate that the OCS has become available.

With reference to the first aspect or the first possible implementation of the first aspect, in a second possible implementation of the first aspect, after switching, by the PCEF, the UE from online charging to offline charging, the method further includes sending, by the PCEF, a first update message to a policy and charging rules function (PCRF), where the first update message is used to indicate that the UE has been switched to offline charging, receiving, by the PCEF, a first update answer message sent by the PCRF, where the first update answer message carries a second control and charging policy, and the second control and charging policy is a control and charging policy that is of the UE and that is adjusted by the PCRF according to the first update message, and executing, by the PCEF, the second control and charging policy on the UE.

With reference to the second possible implementation of the first aspect, in a third possible implementation of the first aspect, the first update message includes a first Event-Trigger attribute-value pair (AVP), the first Event-Trigger AVP includes a first parameter value, and the first parameter value is used to indicate that the UE has been switched to offline charging.

With reference to the second possible implementation of the first aspect, in a fourth possible implementation of the first aspect, after restoring, by the PCEF, the UE from offline charging to online charging, the method further includes sending, by the PCEF, a second update message to the PCRF, where the second update message is used to indicate that the UE has been restored to online charging, receiving, by the PCEF, a second update answer message sent by the PCRF, where the second update answer message carries a first control and charging policy, and the first control and charging policy is a control and charging policy that is of the UE and that is restored by the PCRF according to the second update message, and executing, by the PCEF, the first control and charging policy on the UE.

With reference to the fourth possible implementation of the first aspect, in a fifth possible implementation of the first aspect, the second update message includes a second Event-Trigger AVP, the second Event-Trigger AVP includes a second parameter value, and the second parameter value is used to indicate that the UE has been restored to online charging.

With reference to the fourth possible implementation of the first aspect, in a sixth possible implementation of the first aspect, quality of service (QoS) in the second control and charging policy is lower than QoS in the first control and charging policy.

With reference to the first possible implementation of the first aspect, in a seventh possible implementation of the first aspect, learning, by the PCEF, that an OCS is unavailable includes learning, by the PCEF, that a link between the PCEF and the OCS fails, and sending, by the PCEF, a request message to the OCS includes sending, by the PCEF, the request message to the OCS after perceiving that a failure in the link between the PCEF and the OCS is rectified, or learning, by the PCEF, that the OCS makes no response, or receiving an error code sent by the OCS, and sending, by the PCEF, a request message to the OCS includes regularly sending, by the PCEF, the request message to the OCS.

With reference to any one of the first aspect, the first possible implementation of the first aspect, or the seventh possible implementation of the first aspect, in an eighth possible implementation of the first aspect, switching, by the PCEF, the UE from online charging to offline charging includes performing, by the PCEF, charging data record splitting to generate an offline charging data record, where the offline charging data record carries a switched-to-offline flag, and the switched-to-offline flag is used to identify that a BS performs differential charging processing on the offline charging data record, and restoring, by the PCEF, the UE from offline charging to online charging includes performing, by the PCEF, charging data record splitting such that a newly generated offline charging data record no longer carries the switched-to-offline flag.

With reference to either one of the first possible implementation of the first aspect and the seventh possible implementation of the first aspect, in a ninth possible implementation of the first aspect, the request message is a credit-control-request initial (CCR-I) message, and the success response message is a credit-control-answer initial (CCA-I) message.

According to a second aspect, an embodiment of the present disclosure provides a charging method, including switching, by a PCEF, UE from online charging to offline charging, sending, by the PCEF, a first update message to a PCRF, where the first update message is used to indicate that the UE has been switched to offline charging, receiving, by the PCEF, a first update answer message sent by the PCRF, where the first update answer message carries a second control and charging policy, and the second control and charging policy is a control and charging policy that is of the UE and that is adjusted by the PCRF according to the first update message, and executing, by the PCEF, the second control and charging policy on the UE.

With reference to the second aspect, in a first possible implementation of the second aspect, the first update message includes a first Event-Trigger AVP, the first Event-Trigger AVP includes a first parameter value, and the first parameter value is used to indicate that the UE has been switched to offline charging.

With reference to the second aspect, in a second possible implementation of the second aspect, the method further includes sending, by the PCEF, a second update message to the PCRF after the PCEF restores the UE from offline charging to online charging, where the second update message is used to indicate that the UE has been restored to online charging, receiving, by the PCEF, a second update answer message sent by the PCEF, where the second update answer message carries a first control and charging policy, and the first control and charging policy is a control and charging policy that is of the UE and that is restored by the PCRF according to the second update message, and executing, by the PCEF, the first control and charging policy on the UE.

With reference to the second possible implementation of the second aspect, in a third possible implementation of the second aspect, the second update message includes a second Event-Trigger AVP, the second Event-Trigger AVP includes a second parameter value, and the second parameter value is used to indicate that the UE has been restored to online charging.

With reference to the second possible implementation of the second aspect or the third possible implementation of the second aspect, in a fourth possible implementation of the second aspect, QoS in the second control and charging policy is lower than QoS in the first control and charging policy.

According to a third aspect, an embodiment of the present disclosure provides a charging method, including receiving, by a PCRF, a first update message sent by the PCEF after a PCEF switches UE from online charging to offline charging, where the first update message is used to indicate that the UE has been switched to offline charging, adjusting, by the PCRF, a first control and charging policy of the UE to a second control and charging policy according to the first update message, and sending, by the PCRF, a first update answer message to the PCEF, where the first update answer message carries the second control and charging policy such that after receiving the first update answer message, the PCEF executes the second control and charging policy on the UE.

With reference to the third aspect, in a first possible implementation of the third aspect, the first update message includes a first Event-Trigger AVP, the first Event-Trigger AVP includes a first parameter value, and the first parameter value is used to indicate that the UE has been switched to offline charging.

With reference to the third aspect, in a second possible implementation of the third aspect, the method further includes receiving, by the PCRF, a second update message sent by the PCEF after the PCEF restores the UE from offline charging to online charging, where the second update message is used to indicate that the UE has been restored to online charging, restoring, by the PCRF, the second control and charging policy of the UE to the first control and charging policy according to the second update message, and sending, by the PCRF, a second update answer message to the PCEF, where the second update answer message carries the first control and charging policy such that after receiving the second update answer message, the PCEF executes the first control and charging policy on the UE.

With reference to the second possible implementation of the third aspect, in a third possible implementation of the third aspect, the second update message includes a second Event-Trigger AVP, the second Event-Trigger AVP includes a second parameter value, and the second parameter value is used to indicate that the UE has been restored to online charging.

With reference to any one of the third aspect, or the first possible implementation of the third aspect to the third possible implementation of the third aspect, in a fourth possible implementation of the third aspect, QoS in the second control and charging policy is lower than QoS in the first control and charging policy.

According to a fourth aspect, an embodiment of the present disclosure provides a network device, including a processing unit configured to perform online charging for UE, and learn that an OCS is unavailable. Then switch the UE from online charging to offline charging, and start an offline timer, where the offline timer is configured to indicate a maximum time from offline charging to deactivation for the UE, and if the PCEF learns, before the offline timer expires, that the OCS becomes available, restore the UE from offline charging to online charging.

With reference to the fourth aspect, in a first possible implementation of the fourth aspect, the network device further includes a sending unit configured to send a request message to the OCS, and a receiving unit configured to receive a success response message sent by the OCS, where the success response message is a response to the request message, and is used to indicate that the OCS has become available.

With reference to the fourth aspect or the first possible implementation of the fourth aspect, in a second possible implementation of the fourth aspect, the sending unit is further configured to send a first update message to a PCRF after the processing unit switches the UE from online charging to offline charging, where the first update message is used to indicate that the UE has been switched to offline charging, the receiving unit is further configured to receive a first update answer message sent by the PCRF, where the first update answer message carries a second control and charging policy, and the second control and charging policy is a control and charging policy that is of the UE and that is adjusted by the PCRF according to the first update message, and the processing unit is further configured to execute the second control and charging policy on the UE.

With reference to the second possible implementation of the fourth aspect, in a third possible implementation of the fourth aspect, the sending unit is further configured to send a second update message to the PCRF after the processing unit restores the UE from offline charging to online charging, where the second update message is used to indicate that the UE has been restored to online charging, the receiving unit is further configured to receive a second update answer message sent by the PCEF, where the second update answer message carries a first control and charging policy, and the first control and charging policy is a control and charging policy that is of the UE and that is restored by the PCRF according to the second update message, and the processing unit is further configured to execute the first control and charging policy on the UE.

With reference to the first possible implementation of the fourth aspect, in a fourth possible implementation of the fourth aspect, when the processing unit is further configured to learn that a link between the network device and the OCS fails, the sending unit is further configured to send the request message to the OCS after it is perceived that a failure in the link between the network device and the OCS is rectified, or when the processing unit is further configured to learn that the OCS makes no response, or receive an error code sent by the OCS, the sending unit is further configured to regularly send the request message to the OCS.

With reference to any one of the fourth aspect, the first possible implementation of the fourth aspect, or the fourth possible implementation of the fourth aspect, in a fifth possible implementation of the fourth aspect, when switching the UE from online charging to offline charging, the processing unit is further configured to perform charging data record splitting to generate an offline charging data record, where the offline charging data record carries a switched-to-offline flag, and the switched-to-offline flag is used to identify that a BS performs differential charging processing on the offline charging data record, and when restoring the UE from offline charging to online charging, the processing unit is further configured to perform charging data record splitting such that a newly generated offline charging data record no longer carries the switched-to-offline flag.

According to a fifth aspect, an embodiment of the present disclosure further provides a network device, including a processing unit configured to switch UE from online charging to offline charging, a sending unit configured to send a first update message to a PCRF, where the first update message is used to indicate that the UE has been switched to offline charging, and a receiving unit configured to receive a first update answer message sent by the PCRF, where the first update answer message carries a second control and charging policy, and the second control and charging policy is a control and charging policy that is of the UE and that is adjusted by the PCRF according to the first update message, where the processing unit is further configured to execute the second control and charging policy on the UE.

With reference to the fifth aspect, in a first possible implementation of the fifth aspect, the sending unit is further configured to send a second update message to the PCRF after the UE is restored from offline charging to online charging, where the second update message is used to indicate that the UE has been restored to online charging, the receiving unit is further configured to receive a second update answer message sent by the PCRF, where the second update answer message carries a first control and charging policy, and the first control and charging policy is a control and charging policy that is of the UE and that is restored by the PCRF according to the second update message, and the processing unit is further configured to execute the first control and charging policy on the UE.

According to a sixth aspect, an embodiment of the present disclosure further provides a network device, including a receiving unit configured to receive a first update message sent by the PCEF after a PCEF switches UE from online charging to offline charging, where the first update message is used to indicate that the UE has been switched to offline charging, a processing unit configured to adjust a first control and charging policy of the UE to a second control and charging policy according to the first update message received by the receiving unit, and a sending unit configured to send a first update answer message to the PCEF, where the first update answer message carries the second control and charging policy such that after receiving the first update answer message, the PCEF executes the second control and charging policy on the UE.

With reference to the sixth aspect, in a first possible implementation of the sixth aspect, the receiving unit is further configured to receive a second update message sent by the PCEF after the PCEF restores the UE from offline charging to online charging, where the second update message is used to indicate that the UE has been restored to online charging, the processing unit is further configured to restore the second control and charging policy of the UE to the first control and charging policy according to the second update message received by the receiving unit, and the sending unit is further configured to send a second update answer message to the PCEF, where the second update answer message carries the first control and charging policy such that after receiving the second update answer message, the PCEF executes the first control and charging policy on the UE.

According to a seventh aspect, an embodiment of the present disclosure further provides a BS, including a PCEF and an OCS, where the PCEF is configured to perform online charging for UE, switch the UE from online charging to offline charging, and start an offline timer when learning that the OCS is unavailable, where the offline timer is configured to indicate a maximum time from offline charging to deactivation for the UE, and restore the UE from offline charging to online charging if it is learned, before the offline timer expires, that the OCS becomes available.

According to an eighth aspect, an embodiment of the present disclosure further provides a BS, including a PCEF and a PCRF, where the PCEF is configured to switch UE from online charging to offline charging, and send a first update message to the PCRF, where the first update message is used to indicate that the UE has been switched to offline charging, the PCRF is configured to receive the first update message sent by the PCEF, adjust a first control and charging policy of the UE to a second control and charging policy according to the first update message, and send a first update answer message to the PCEF, where the first update answer message carries the second control and charging policy, and the PCEF is further configured to receive the first update answer message sent by the PCRF, and execute the second control and charging policy on the UE.

It can be learned from the foregoing technical solutions that the solutions in the embodiments of the present disclosure have the following beneficial effects.

In the embodiments of the present disclosure, if it is learned, in a process of performing online charging for the UE, that the OCS is unavailable, the PCEF switches the UE from online charging to offline charging, and starts the offline timer. Then, if the PCEF learns, before the timer expires, that the OCS becomes available, the PCEF restores the UE from offline charging to online charging, instead of performing an operation in which the PCEF stops offline charging for the UE and deactivates the UE after the offline timer expires. According to the solutions, after a user is switched to offline charging, an online charging function can be recovered in a timely manner when the OCS becomes available. In this way, a user account overdraft risk possibly existing in an offline charging process is mitigated, and deactivation of the user can be avoided in the solutions, thereby improving user experience.

DESCRIPTION OF EMBODIMENTS

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person skilled in the art based on the embodiments of the present disclosure without creative efforts shall fall within the protection scope of the present disclosure.

In this specification, claims, and accompanying drawings of the present disclosure, the terms "first," "second," and so on are intended to distinguish between similar objects, but do not necessarily indicate a specific order or sequence. It should be understood that the data termed in such a way are interchangeable in proper circumstances so that the embodiments of the present disclosure described herein can be implemented in other orders than the order illustrated or described herein. In addition, the terms "include," "have," or any other variants thereof are intended to cover a non-exclusive inclusion. For example, a process, a method, a system, a product, or a device that includes a series of steps or modules is not necessarily limited to the steps or modules that are expressly listed, but may include another step or module not expressly listed or inherent to the process, the method, the product, or the device. The module division in this specification is merely logical division, and may be other division during implementation in actual application. For example, multiple modules may be combined or integrated into another system, or some features may be ignored or not performed. In addition, the displayed or discussed mutual couplings or direct couplings or communication connections may be implemented using some interfaces. The indirect couplings or communication connections between the modules may be implemented in electronic or another form, and this is not limited in this specification. In addition, modules or sub-modules described as separate components may be or may not be physically separated, or may be or may not be physical modules, or may be distributed in multiple circuit modules. Objectives of the solutions of the embodiments of the present disclosure may be achieved by selecting some or all of the modules according to actual requirements.

Figure 1:
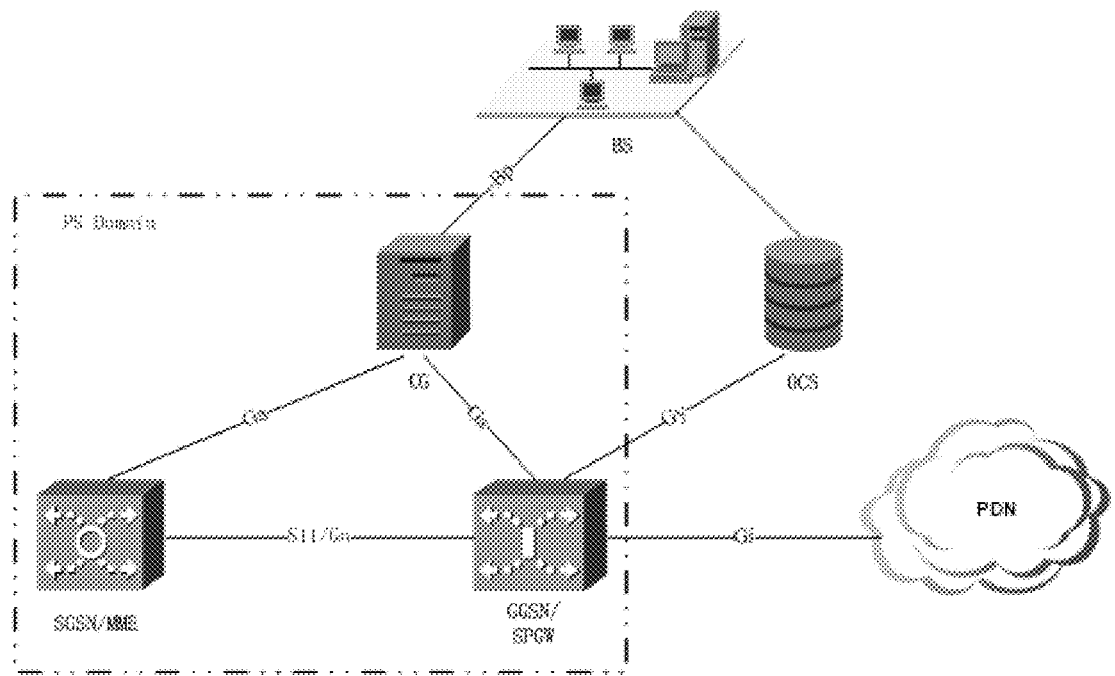
FIG. 1 is a networking diagram of a BS in a packet switch (PS) domain according to an embodiment of the present disclosure.

In a mobile communications network, networking of a BS in a PS domain according to an embodiment of the present disclosure, is shown in FIG. 1.

In an example of a general packet radio service (GPRS) or Universal Mobile Telecommunications System (UMTS) network, a serving GPRS support node (SGSN) forwards an incoming/outgoing Internet Protocol (IP) packet to a mobile device (i.e., UE) within a service area of the SGSN, and the SGSN traces a location of the UE and performs a security function and access control, a gateway GPRS support node (GGSN) provides routing and encapsulation of a data packet between the GPRS/UMTS network and an external data network, and performs control and charging on a service used by a user, an OCS is a functional entity that performs real-time credit control, and functionality of the OCS includes transaction handling, rating, online correlation, and management of a user account balance, a charging gateway (CG) is responsible for collecting, consolidating, and preprocessing charging data records generated by the SGSN/GGSN, and provides an interface for communication with a billing center (i.e., BS), and a BS generates a bill visible to a user. The BS processes charging data obtained from the CG or the OCS, and generates a final user bill.

In the example of the GPRS/UMTS network, as a client, the GGSN uses the Diameter protocol to interact with the OCS using an online charging reference point between a PCEF and the OCS (i.e., Gy) to implement an online charging function. By means of quota management and real-time quota delivery, the OCS can perform, according to a user account status, real-time credit control on a service used by a user. The GGSN uses the GPRS tunneling protocol (GTP) to send, to the CG, a charging data record generated by the GGSN using a reference point between a PS domain gateway and the CG for charging data record transfer (i.e., Ga) to implement an offline charging function. After preprocessing the charging data record, the CG sends the charging data record to the BS using a reference point for a PS domain charging data record file transfer from the CG to the billing center (i.e., Bp), and the BS completes final fee deduction processing.

After deploying and using online charging, an operator can precisely control service usage of a user in real time according to an account status of the user, improving accuracy and timeliness of charging. Offline charging information may be used for account reconciliation to ensure correct and accurate online charging. In addition, after the OCS fails or communication between the OCS and the GGSN is interrupted, the offline charging information may be used as a basis for complementary fee deduction after the OCS fails.

It should be noted that a charging scenario for the PS domain of the mobile communications system is used as an example for description in this embodiment and the following embodiments of the present disclosure.

Figure 2:
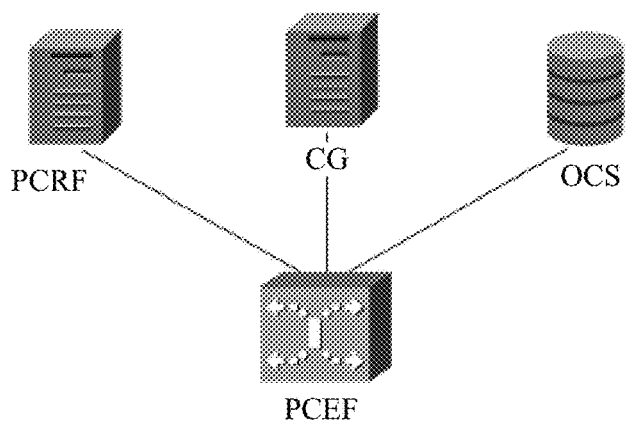
FIG. 2 is an architectural diagram of a system according to an embodiment of the present disclosure.

FIG. 2 is an architectural diagram of a system according to an embodiment of the present disclosure. With reference to FIG. 2, in this embodiment of the present disclosure, a PCEF is located at a gateway, may be a GGSN in a GPRS network, and is configured to provide routing and encapsulation of a data packet between the GPRS network and an external data network, and execute a control and charging policy delivered by a PCRF to implement a charging function, or a PCEF may be a serving packet data network (PDN) gateway (PGW) of an evolved packet core (EPC) shown in FIG. 1, and is configured to provide routing and encapsulation of a data packet between a UMTS network and an external data network, and execute a control and charging policy delivered by a PCRF to implement a charging function.

In this embodiment of the present disclosure, functionality of an OCS includes transaction handling, rating, online correlation, and management of a user account balance, and the OCS cooperates with the PCEF to complete online charging. A CG is responsible for collecting, consolidating, and preprocessing charging data records generated by an SGSN/GGSN, and provides an interface for communication with a billing center, and the CG cooperates with the PCEF to complete offline charging. A PCRF implements functions of dynamic QoS policy control and dynamic flow-based charging control, and further provides an authorization control function that is based on user subscription information, and delivers a control and charging policy to the PCEF.

This embodiment of the present disclosure may be applied to another similar system having both an online charging function and an offline charging function such that after online charging is switched to offline charging, online charging can be recovered without service interruption.

In addition, this embodiment of the present disclosure may also be applied to another similar system in which the PCRF, the online charging function, and the offline charging function are all deployed such that control and charging policy adjustment can be performed when online charging is switched to offline charging, and when online charging is recovered.

The following describes a method for recovering online charging without service interruption after online charging is switched to offline charging in an embodiment of the present disclosure.

Figure 3:
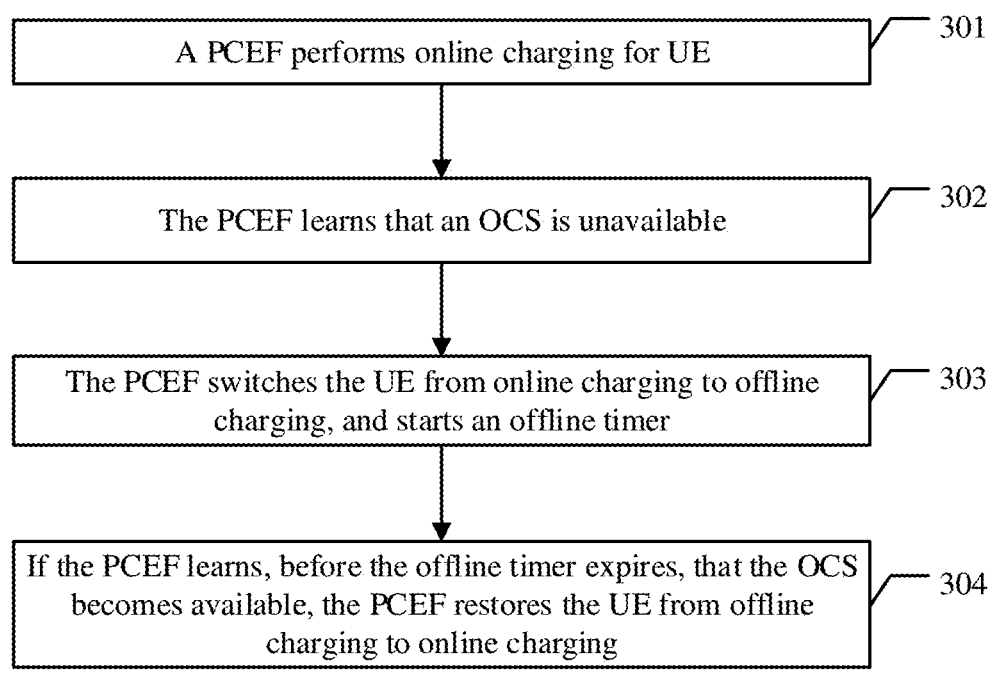
FIG. 3 is a flowchart of a charging method according to an embodiment of the present disclosure.

With reference to FIG. 3, a flowchart of a charging method according to an embodiment of the present disclosure includes the following steps.

Step 301: A PCEF performs online charging for UE.

In a UE activation process, the UE sends a service request to the PCEF, and after receiving the service request of the UE, the PCEF interacts with an OCS to perform activation authentication in order to complete UE activation.

After the UE is activated, the PCEF interacts with the OCS to start to perform online charging for the UE. In an online charging process, the UE uses the PCEF to apply for a quota or report a used quota to the OCS, and the OCS can control, by means of quota management and real-time quota delivery, a user account status corresponding to the UE in order to perform real-time credit control on a service used by a user.

Step 302: The PCEF learns that an OCS is unavailable.

When the PCEF applies for the quota or reports the used quota to the OCS in the online charging process, if the quota application or the quota reporting fails due to an OCS failure or for another reason, the PCEF may learn that the OCS is unavailable.

Step 303: The PCEF switches the UE from online charging to offline charging, and starts an offline timer.

When the PCEF learns that the OCS is unavailable, the PCEF switches the UE from online charging to offline charging, thereby ensuring continuing use of a service and improving user experience. However, to avoid an account overdraft caused when the user who is switched to offline charging uses the service for a long time, the PCEF sets the offline timer when switching the UE from online charging to offline charging. The offline timer is configured to set duration for offline charging of the UE, that is, a maximum time from offline charging to deactivation for the UE. When the offline timer expires, the UE is deactivated, and a service currently used by the user is interrupted.

Step 304: If the PCEF learns, before the offline timer expires, that the OCS becomes available, the PCEF restores the UE from offline charging to online charging.

In an offline charging process, the PCEF attempts to restore communication with the OCS, and if the PCEF learns, before the offline timer expires, that the OCS becomes available, it indicates that the OCS can interact with the PCEF to implement an online charging function. Therefore, the PCEF restores the UE from offline charging to online charging such that the system recovers the online charging function without interrupting the service currently used by the user.

In this embodiment of the present disclosure, if it is learned, in the process of performing online charging for the UE, that the OCS is unavailable, the PCEF switches the UE from online charging to offline charging, and starts the offline timer. Then, if the PCEF learns, before the timer expires, that the OCS becomes available, the PCEF restores the UE from offline charging to online charging, instead of performing an operation in which the PCEF stops offline charging for the UE and deactivates the UE after the offline timer expires. Therefore, according to the solution, after the user is switched to offline charging, the online charging function can be recovered in a timely manner when the OCS becomes available. In this way, a user account overdraft risk possibly existing in the offline charging process is mitigated, and deactivation of the user can be avoided in the solution, thereby improving user experience.

In a process of performing offline charging, from the PCEF, a PCRF may subscribe to an event of switching from online charging to offline charging and an online charging recovery event, and perform control and charging policy adjustment, improving policy control flexibility.

Figure 4:
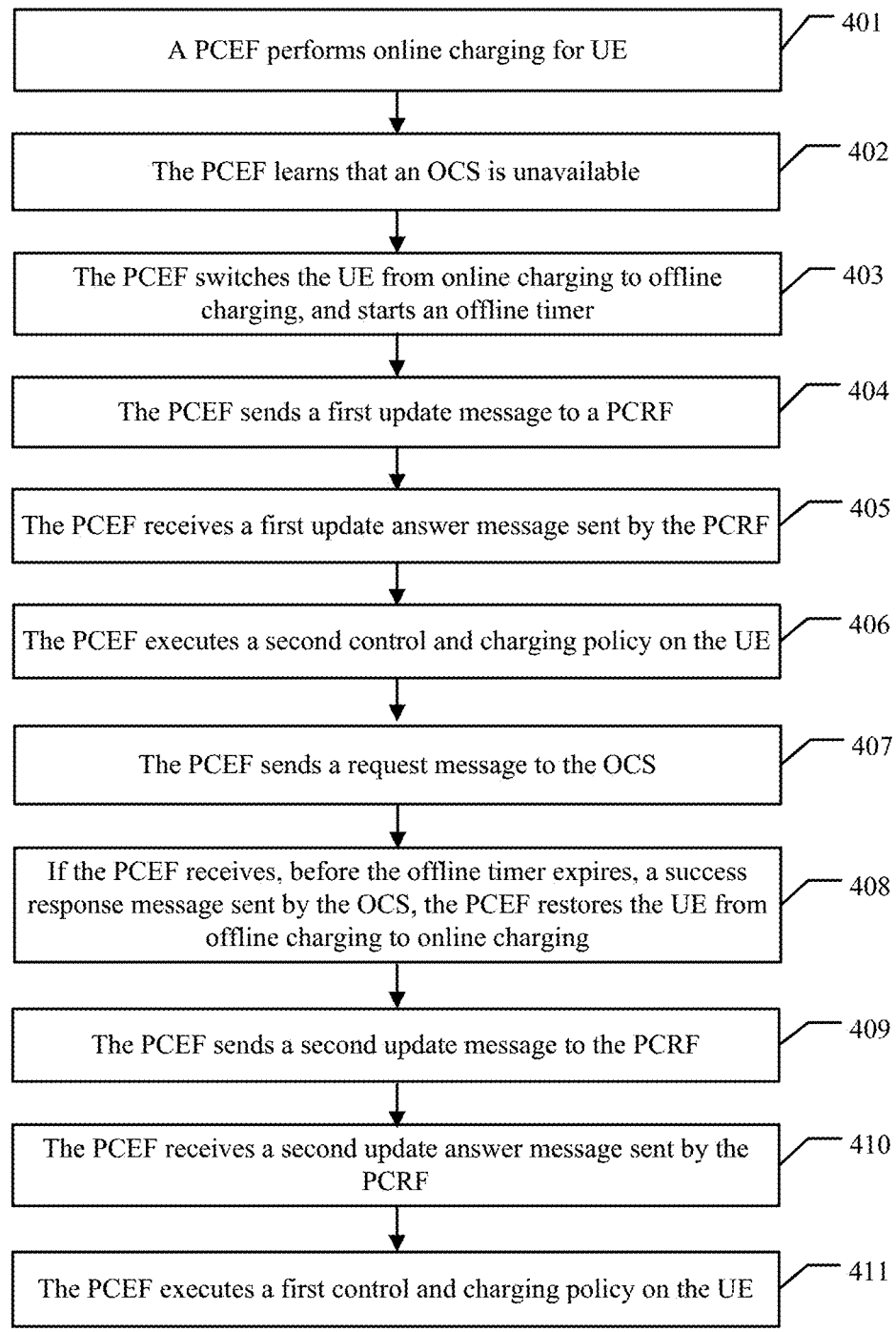
FIG. 4 is another flowchart of a charging method according to an embodiment of the present disclosure.

With reference to FIG. 4, another flowchart of a charging method according to an embodiment of the present disclosure includes the following steps.

Step 401: A PCEF performs online charging for UE.

In a UE activation process, the UE sends a service request to the PCEF, and after the PCEF receives the service request of the UE, the PCEF interacts with an OCS to perform activation authentication, and interacts with a PCRF to obtain a control and charging policy in order to complete UE activation.

A control and charging policy used by the UE in an online charging process is referred to as a first control and charging policy.

After the UE is activated, the PCEF interacts with the OCS to start to perform online charging for the UE. In the online charging process, the UE uses the PCEF to apply for a quota or report a used quota to the OCS, and the OCS can control, by means of quota management and real-time quota delivery, a user account status corresponding to the UE in order to perform real-time credit control on a service used by a user.

Step 402: The PCEF learns that an OCS is unavailable.

When the PCEF applies for the quota or reports the used quota to the OCS in the online charging process, if the quota application or the quota reporting fails due to an OCS failure or for another reason, the PCEF may learn that the OCS is unavailable.

Further, there may be the following several scenarios of OCS unavailability.

Scenario 1: A communication link between the PCEF and the OCS fails.

When the PCEF sends a message to the OCS to apply for the quota or report the used quota, if the PCEF detects that the communication link between the PCEF and the OCS fails, the PCEF may determine that the OCS is unavailable.

It should be noted that the PCEF detects that the communication link between the PCEF and the OCS fails is in the other approaches. Further, detection may be performed using a heartbeat packet, and details are not described herein.

Scenario 2: The OCS makes no response after receiving a message sent by the PCEF.

When the OCS fails, and the PCEF sends the message to the OCS to apply for the quota or report the used quota, if the PCEF has not received, within a predetermined time, a response message sent by the OCS, the PCEF may determine that the OCS is unavailable.

Scenario 3: The OCS returns an error code.

When overloaded, the OCS sends the error code (i.e., Result-Code) to notify the PCEF that the OCS cannot process a service currently. When receiving the Result-Code, the PCEF may determine that the OCS is unavailable.

It should be noted that, in addition to the foregoing three cases, there may be other cases of OCS unavailability. This is not limited herein.

Step 403: The PCEF switches the UE from online charging to offline charging, and starts an offline timer.

When applying for the quota or reporting the used quota to the OCS, if the PCEF finds that the OCS is unavailable, the PCEF switches the UE from online charging to offline charging, thereby ensuring continuing use of a service and improving user experience. However, to avoid an account overdraft caused when the user who is switched to offline charging uses the service for a long time, the PCEF sets the offline timer when switching the UE from online charging to offline charging. The offline timer is configured to set duration for offline charging of the UE, that is, a maximum time from offline charging to deactivation for the UE. When the offline timer expires, the UE is deactivated, and a service currently used by the user is interrupted.

Step 404: The PCEF sends a first update message to a PCRF.

When the PCEF switches the UE from online charging to offline charging, or after the PCEF switches the UE from online charging to offline charging, the PCEF interacts with the PCRF to obtain a control and charging policy. In this case, the PCEF sends the first update message to the PCRF to report, to the PCRF, an event that the UE is switched from online charging to offline charging. After receiving the first update message, the PCRF adjusts the first control and charging policy used by the UE during online charging to a second control and charging policy in order to mitigate a user account overdraft risk.

It should be noted that, the first update message sent by the PCEF to the PCRF may be a credit-control-request update (CCR-U) message, or may be another message. This is not limited herein.

In a specific implementation, the PCEF sends the CCR-U message to the PCRF using a Gx interface for communication with the PCRF. The CCR-U message carries an Event-Trigger AVP. The Event-Trigger AVP is used to report an event to the PCRF such that the PCRF generates different control and charging policies according to different events. Parameter values of the Event-Trigger AVP are extended such that one of the parameter values is used to indicate an event of switching from online charging to offline charging, and the parameter value is referred to as a first parameter value. The PCRF generates a corresponding control and charging policy according to the first parameter value in the Event-Trigger AVP in the CCR-U message of the UE, and the control and charging policy is referred to as the second control and charging policy.

In a specific implementation, that the PCRF adjusts the first control and charging policy used by the UE during online charging to the second control and charging policy used during offline charging may include adjusting QoS in the control and charging policy. Further, the QoS in the control and charging policy is reduced. For example, a QoS parameter such as a stream service quality class of the UE, an uplink rate, a downlink rate, a bit error rate, a packet loss rate, a delay, a jitter, or a peak rate is controlled such that QoS in the second control and charging policy is lower than the QoS in the first control and charging policy, thereby mitigating the user account overdraft risk.

It should be noted that, when adjusting the first control and charging policy used by the UE during online charging to the second control and charging policy, in addition to adjusting the QoS in the control and charging policy, the PCRF may adjust another parameter in the control and charging policy, for example, adjust a charging rate to mitigate the user account overdraft risk. A specific adjustment method is not limited herein.

Step 405: The PCEF receives a first update answer message sent by the PCRF.

After the PCEF sends the first update message to the PCRF, the PCRF adjusts the first control and charging policy of the UE to the second control and charging policy. Then the PCRF sends the second control and charging policy to the PCEF using the first update answer message, and the PCEF receives the first update answer message sent by the PCRF.

It should be noted that, the first update answer message sent by the PCRF to the PCEF may be a credit-control-answer update (CCA-U) message, or may be another message. This is not limited herein.

Step 406: The PCEF executes a second control and charging policy on the UE.

After receiving the first update answer message sent by the PCRF, the PCEF executes the second control and charging policy on the UE.

If the PCRF adjusts the control and charging policy by reducing QoS of the UE, the QoS of the UE in an offline charging process is reduced after the PCEF executes the second control and charging policy on the UE, thereby mitigating the user account overdraft risk.

Step 407: The PCEF sends a request message to the OCS.

After the PCEF switches the UE from online charging to offline charging, and before the offline timer expires, the PCEF sends the request message to the OCS to re-set up a session with the OCS.

In a specific implementation, the PCEF sends the request message to the OCS in the following manners.

Manner 1: The PCEF sends the request message to the OCS immediately when perceiving that the OCS is available.

When the link between the PCEF and the OCS fails, the PCEF determines that the OCS is unavailable. In this case, if the PCEF perceives that a failure in the link between the PCEF and the OCS is rectified, the PCEF immediately sends the request message to the OCS to re-set up the session with the OCS.

The PCEF perceives that the failure in the link between the PCEF and the OCS is rectified in the other approaches. Further, detection may be performed using a heartbeat packet, and details are not described herein.

Manner 2: The PCEF regularly sends the request message to the OCS.

When the OCS makes no response or the PCEF receives the error code (i.e., Result-Code) returned by the OCS, the PCEF determines that the OCS is unavailable. In this case, the PCEF regularly sends the request message to the OCS to re-set up the session with the OCS.

It should be noted that, in addition to the foregoing three cases, there may be other cases of OCS unavailability. For the other unavailability cases, processing may also be performed with reference to the foregoing manners.

The PCEF detects that the failure in the link between the PCEF and the OCS is rectified in the other approaches, and details are not described herein.

In a specific implementation, the request message sent by the PCEF to the OCS may be a CCR-I message.

It should be noted that, step 407 and steps 402, 403, and 404 have no definite time sequence relationship, and may be performed concurrently.

Step 408: If the PCEF receives, before the offline timer expires, a success response message sent by the OCS, the PCEF restores the UE from offline charging to online charging.

After the PCEF sends the request message to the OCS to re-set up the session, if the PCEF receives, before the offline timer expires, the success response message sent by the OCS, it indicates that the OCS has become available, and can interact with the PCEF to implement an online charging function, where the success response message is a response of the OCS to the request message sent by the PCEF.

Therefore, after receiving the success response message of the OCS, the PCEF restores the UE from offline charging to online charging such that the system recovers the online charging function without interrupting the service currently used by the user.

In a specific implementation, the success response message sent by the OCS to the PCEF may be a CCA-I message.

Step 409: The PCEF sends a second update message to the PCRF.

After restoring the UE from offline charging to online charging, the PCEF interacts with the PCRF to obtain a control and charging policy in order to restore the control and charging policy of the UE.

The PCEF sends the second update message to the PCRF to report, to the PCRF, an event that the UE is restored to online charging. After receiving the second update message, the PCRF restores the second control and charging policy used by the UE during offline charging to the first control and charging policy used during online charging.

It should be noted that, the second update message sent by the PCEF to the PCRF may be a CCR-U message, or may be another message. This is not limited herein.

In a specific implementation, the PCEF sends the CCR-U message to the PCRF using the Gx interface for communication with the PCRF. A parameter value of an Event-Trigger AVP in the CCR-U message is extended such that the extended parameter value is used to indicate an online charging recovery event, and the parameter value is referred to as a second parameter value. The PCRF restores the control and charging policy of the UE to the first control and charging policy according to the second parameter value in the Event-Trigger AVP in the CCR-U message of the UE.

If the PCRF adjusts the control and charging policy by reducing the QoS of the UE when online charging is switched to offline charging, the PCRF restores the second control and charging policy of the UE to the first control and charging policy by restoring the QoS of the UE.

Step 410: The PCEF receives a second update answer message sent by the PCRF.

After the PCEF sends the second update message to the PCRF, the PCRF restores the second control and charging policy of the UE to the first control and charging policy.

Then the PCRF sends the first control and charging policy to the PCEF using the second update answer message, and the PCEF receives the second update answer message sent by the PCRF.

It should be noted that, the second update answer message sent by the PCRF to the PCEF may be a CCA-U message, or may be another message. This is not further limited herein.

Step 411: The PCEF executes a first control and charging policy on the UE.

After receiving the second update answer message sent by the PCRF, the PCEF executes the first control and charging policy on the UE in order to restore the control and charging policy used by the UE during online charging.

If the PCRF adjusts the control and charging policy of the UE by reducing the QoS in the control and charging policy when online charging is switched to offline charging, the QoS of the UE is restored after the PCEF executes the first control and charging policy on the UE.

In this embodiment of the present disclosure, when online charging is switched to offline charging or online charging is recovered, the PCEF sends, to the PCRF, an update message that carries the event of switching from online charging to offline charging or the online charging recovery event, and the PCRF adjusts the control and charging policy of the UE according to the message, thereby further mitigating the user account overdraft risk.

Then, in this embodiment of the present disclosure, the user does not need to be deactivated. On the premise that the user who is switched to offline charging is not deactivated (not offline), online charging can be recovered only by means of signaling interworking between the PCEF and the OCS such that signaling overheads can be reduced.

Further, in specific implementation, when the UE is switched from online charging to offline charging, or restored to online charging, charging data record splitting needs to be performed. A charging data record generated during offline charging carries a switched-to-offline flag, and is used as a basis for complementary fee deduction.

In a process in which the PCEF switches the UE from online charging to offline charging, the PCEF performs charging data record splitting, and the charging data record splitting is considered as a first time of charging data record splitting. After the first time of charging data record splitting, each charging data record subsequently generated in the offline charging process carries the switched-to-offline flag, and the switched-to-offline flag is used to identify that a BS needs to perform differential processing on the offline charging data record, that is, to perform complementary fee deduction.

After receiving the success response message sent by the OCS, the PCEF restores the UE from offline charging to online charging. In this process, the PCEF performs charging data record splitting, and the charging data record splitting is considered as a second time of charging data record splitting. After the second time of charging data record splitting, a subsequently generated offline charging data record no longer carries the switched-to-offline flag, and it indicates that in subsequent online charging, the subsequently generated offline charging data record is used only for account reconciliation, but not used as a fee deduction basis.

In this embodiment of the present disclosure, when online charging is switched to offline charging or online charging is recovered, by means of charging data record splitting, the charging data record generated during offline charging carries the switched-to-offline flag, thereby implementing complementary fee deduction on the charging data record in the offline charging process, and improving implementability of the solution.

Figure 5:
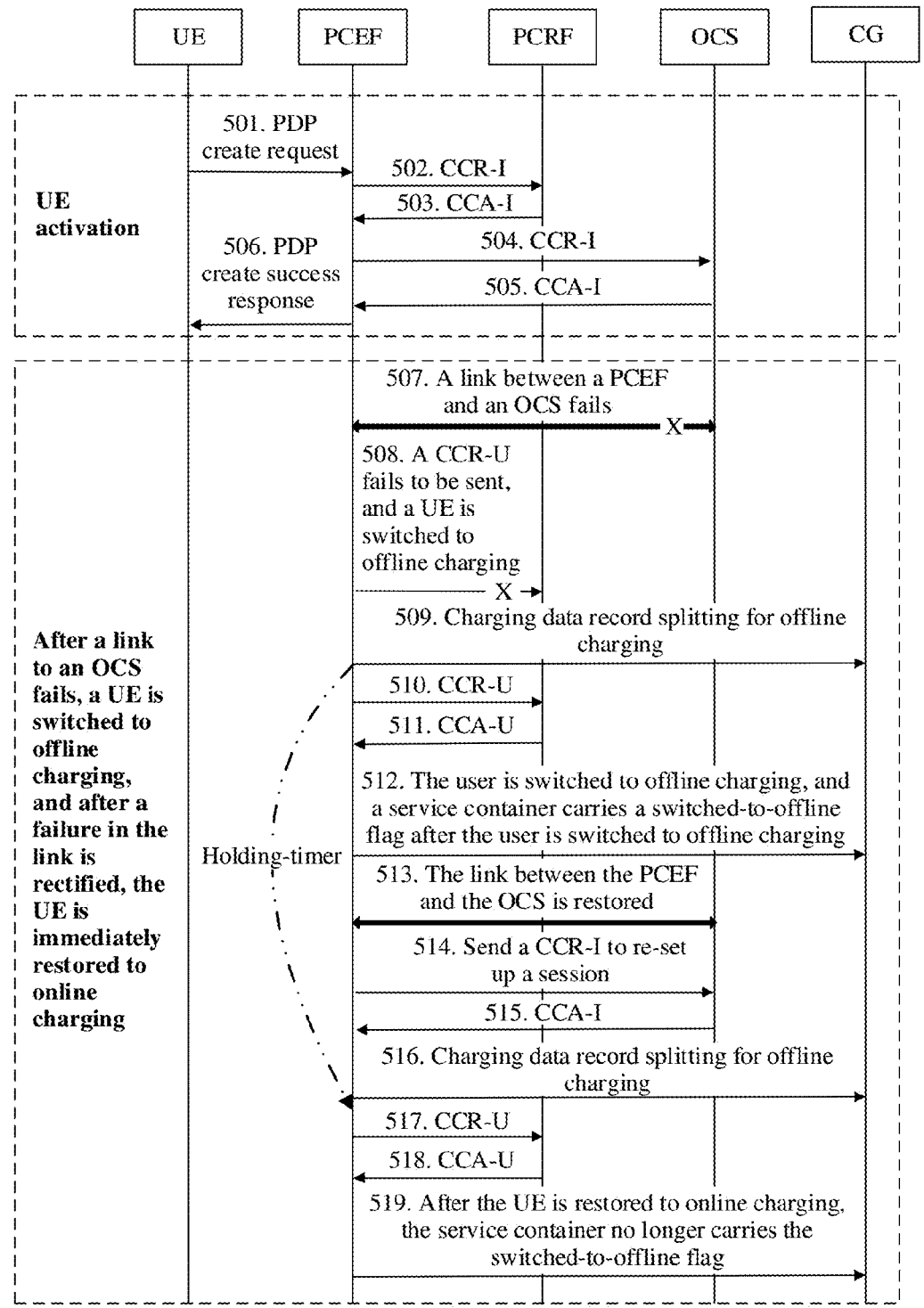
FIG. 5 is a signaling interworking flowchart of online charging auto-recovery according to an embodiment of the present disclosure.
Figure 6:
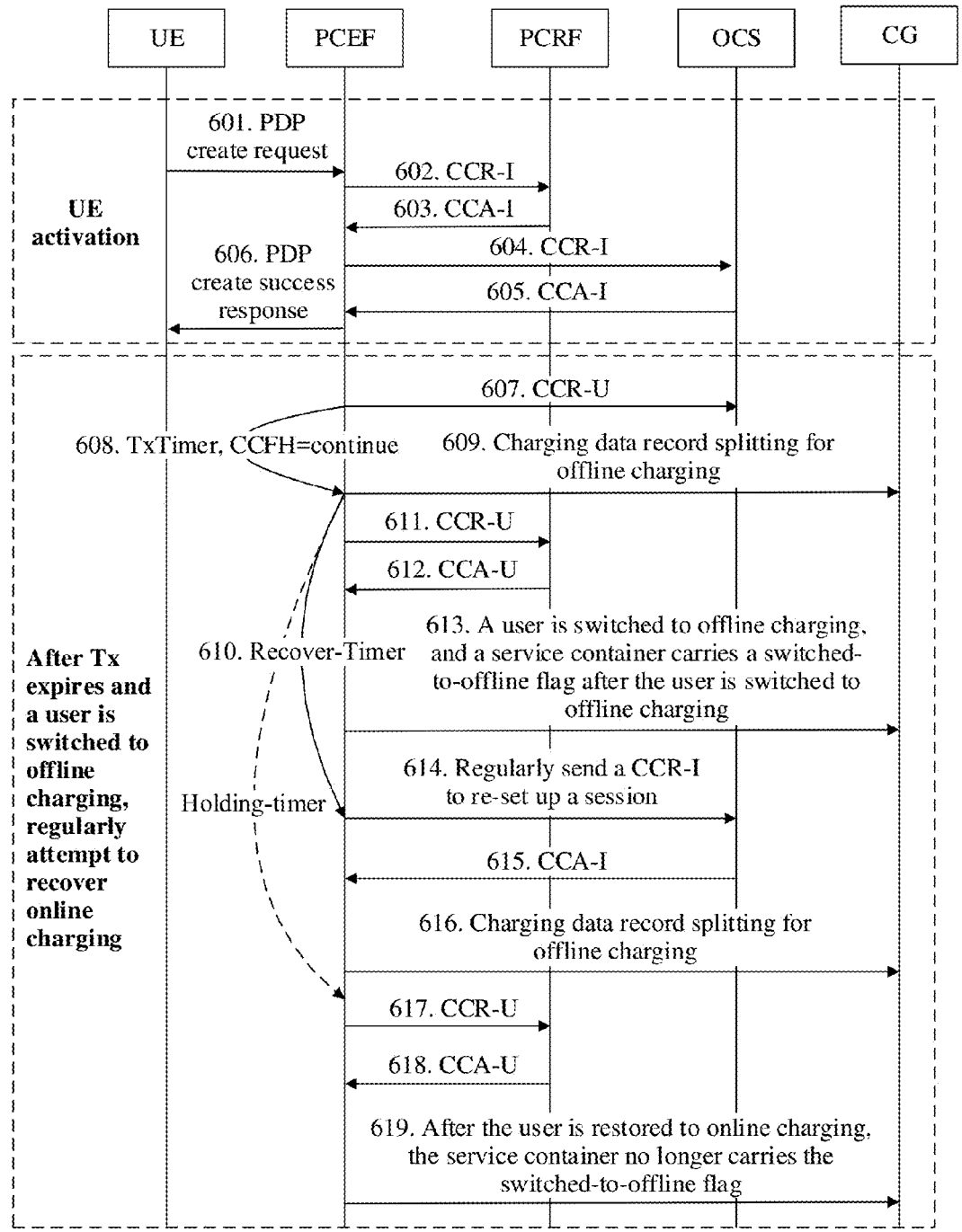
FIG. 6 is another signaling interworking flowchart of online charging auto-recovery according to an embodiment of the present disclosure.

As shown in FIG. 5 and FIG. 6, the following flowcharts describe the online charging method in this embodiment of the present disclosure with reference to specific signaling interworking procedures. According to specific cases of OCS unavailability, there may be the following several implementations.

1. A communication link between a PCEF and an OCS fails.

Step 501: During UE activation, UE sends a Packet Data Protocol (PDP) create request to the PCEF.

Step 502: After receiving the PDP create request from the UE, the PCEF sends a CCR-I message to a PCRF to obtain a control and charging policy of the UE.

Step 503: After receiving the CCR-I message sent by the PCEF, the PCRF returns a CCA-I message to the PCEF to send the control and charging policy of the UE to the PCEF.

Step 504: After receiving the PDP create request from the UE, the PCEF sends a CCR-I message to the OCS to perform activation authentication.

Step 505: After receiving the CCR-I message sent by the PCEF, the OCS returns a CCA-I message to the PCEF to instruct the PCEF to complete activation authentication on the UE.

Step 506: After obtaining the control and charging policy of the UE from the PCRF and completing activation authentication with the OCS, the PCEF sends a PDP create success response message to the UE to complete UE activation.

Step 507: After the UE is successfully activated, the PCEF performs online charging for a service used by the UE, and a communication link between the PCEF and the OCS fails in this process.

Step 508: In an online charging process, the PCEF sends a CCR-U message to the OCS in real time to apply for a quota or report a used quota. When the communication link between the PCEF and the OCS fails, and the CCR-U message fails to be sent, the PCEF switches the UE to offline charging processing, and the UE is switched from online charging to offline charging.

Step 509: When switching the UE from online charging to offline charging, the PCEF starts an offline timer, Holding-Timer, and the PCEF performs charging data record splitting to notify a CG that the UE enters offline charging.

The Holding-Timer is configured to set duration for offline charging of the UE, that is, a maximum time from offline charging to deactivation for the UE. When the offline timer expires, a user is deactivated, and a service currently used by the user is interrupted.

Step 510: After the PCEF switches the UE from online charging to offline charging to mitigate an account overdraft risk of the user in an offline charging process, the PCEF sends a CCR-U message to the PCRF, where the CCR-U message carries, using an extended Event-Trigger AVP, an event that the UE is switched from online charging to offline charging.

Step 511: After receiving the CCR-U message sent by the PCEF, the PCRF adjusts the control and charging policy of the UE according to the event, carried in the Event-Trigger AVP in the message, that the UE is switched from online charging to offline charging. Further, QoS of the UE may be reduced. The PCRF sends an adjusted control and charging policy to the PCEF using a CCA-U message.

Step 512: After receiving the CCA-U message, the PCEF executes the adjusted control and charging policy on the UE. During a period in which the user is in offline charging, each offline charging data record generated by the PCEF (i.e., service container) carries a switched-to-offline flag, and the PCEF sends the charging data record carrying the switched-to-offline flag to the CG to complete offline charging. The switched-to-offline flag is used to identify that a BS needs to perform differential charging processing on the offline charging data record, that is, to perform complementary fee deduction.

Step 513: A failure in the communication link between the PCEF and the OCS is restored.

Step 514: After perceiving that the communication link between the PCEF and the OCS is rectified, the PCEF sends a CCR-I message to the OCS to re-set up a session, where the CCR-I message carries a new Session-id.

Step 515: After receiving the CCR-I message sent by the PCEF, the OCS considers that the message is for activation of a new user, sends a CCA-I message to the PCEF in response, and successfully re-sets up a session with the PCEF.

It should be noted that, a charging identifier (charging-id) carried in the CCR-I message sent by the PCEF is the same as a charging-id used during offline charging in order to ensure successful account reconciliation between online charging and offline charging. The CCR-I message carries an actual activation time (start-time) of the UE, that is, a time at which the UE is successfully activated in step 506, for use in subsequent data statistics.

Step 516: After the session is successfully created between the PCEF and the OCS, the PCEF restores the UE from offline charging to online charging. In this process, the PCEF performs charging data record splitting, notifies the CG that the UE is restored to online charging, and stops the offline timer Holding-Timer.

Step 517: After the PCEF restores the UE from offline charging to online charging, the control and charging policy of the UE needs to be restored again. Therefore, the PCEF sends a CCR-U message to the PCRF to notify the PCRF that the UE has been restored to online charging includes adding, to the CCR-U message using an extended Event-Trigger AVP, an event that the UE is restored to online charging.

Step 518: After receiving the CCR-U message sent by the PCEF, the PCRF restores the control and charging policy of the UE to the control and charging policy prior to the adjustment according to the event, carried in the Event-Trigger AVP in the message, that the UE is restored to online charging. The PCRF sends the restored control and charging policy to the PCEF using a CCA-U message.

Step 519: After receiving the CCA-U message sent by the PCRF, the PCEF restores the control and charging policy of the UE according to the CCA-U message, and notifies the CG that a subsequently generated offline charging data record in the online charging process no longer carries the switched-to-offline flag, that is, the offline charging data record generated in the online charging process is used only for account reconciliation, but not used as a fee deduction basis.

2. An OCS makes no response or returns an error code.

Step 601: During UE activation, UE sends a PDP create request to a PCEF.

Step 602: After receiving the PDP create request from the UE, the PCEF sends a CCR-I message to a PCRF to obtain a control and charging policy of the UE.

Step 603: After receiving the CCR-I message sent by the PCEF, the PCRF returns a CCA-I message to the PCEF to send the control and charging policy of the UE to the PCEF.

Step 604: After receiving the PDP create request from the UE, the PCEF sends a CCR-I message to the OCS to perform activation authentication.

Step 605: After receiving the CCR-I message sent by the PCEF, the OCS returns a CCA-I message to the PCEF to instruct the PCEF to complete activation authentication on the UE.

Step 606: After obtaining the control and charging policy of the UE from the PCRF and completing activation authentication with the OCS, the PCEF sends a PDP create success response message to the UE to complete UE activation.

Step 607: In an online charging process, the PCEF sends a CCR-U message to the OCS in real time to apply for a quota or report a used quota.

Step 608: A Tx Timer set by the PCEF expires, that is, within a predetermined time, no response of the OCS is received, or the OCS returns an error code. A reason why the OCS makes no response may be an OCS failure, and a reason why the OCS returns the error code may be OCS overload.

Step 609: When switching the UE from online charging to offline charging, the PCEF starts an offline timer, Holding-Timer, and the PCEF performs charging data record splitting to notify a CG that the UE enters offline charging.

The Holding-Timer is configured to set duration for offline charging of the UE, that is, a maximum time from offline charging to deactivation for the UE. When the offline timer expires, a user is deactivated, and a service currently used by the user is interrupted.

Step 610: The PCEF starts a timer, Recover-Timer, and when the Recover-Timer expires, sends a message to the OCS to re-set up a session in order to regularly attempt to recover online charging within the Holding-Timer.

Step 611: After the PCEF switches the UE from online charging to offline charging to mitigate an account overdraft risk of the user in an offline charging process, the PCEF sends a CCR-U message to the PCRF, where the CCR-U message carries, using an extended Event-Trigger AVP, an event that the UE is switched from online charging to offline charging.

Step 612: After receiving the CCR-U message sent by the PCEF, the PCRF adjusts the control and charging policy of the UE according to the event, carried in the Event-Trigger AVP in the message, that the UE is switched from online charging to offline charging. Further, QoS of the UE may be reduced. The PCRF sends an adjusted control and charging policy to the PCEF using a CCA-U message.

Step 613: After receiving the CCA-U message, the PCEF executes the adjusted control and charging policy on the UE. During a period in which the user is in offline charging, each offline charging data record generated by the PCEF (i.e., service container) carries a switched-to-offline flag, and the PCEF sends the charging data record carrying the switched-to-offline flag to the CG to complete offline charging. The switched-to-offline flag is used to identify that a BS needs to perform differential charging processing on the offline charging data record, that is, to perform complementary fee deduction.

Step 614: The Recover-Timer expires, and the PCEF regularly sends a CCR-I message to the OCS to re-set up a session, where the CCR-I message carries a new session identifier (Session-id).

Step 615: If the OCS failure is rectified or the OCS overload is cleared, after receiving the CCR-I message sent by the PCEF, the OCS considers that the message is for activation of a new user, sends a CCA-I message to the PCEF in response, and successfully re-sets up a session with the PCEF.

It should be noted that, a charging-id carried in the CCR-I message sent by the PCEF is the same as a charging-id used during offline charging in order to ensure successful account reconciliation between online charging and offline charging. The CCR-I message carries an actual activation time (start-time) of the UE, that is, a time at which the UE is successfully activated in step 606, for use in subsequent data statistics.

If the OCS failure is not rectified or the OCS overload is not cleared, after sending the CCR-I message to the OCS, the PCEF still cannot receive, within the predetermined time, the CCA-I message sent by the OCS, or receives the error code sent by the OCS. In this case, the PCEF restarts the timer, Recover-Timer, and performs operations from step 610 to step 615 again.

Step 616: After the session is successfully created between the PCEF and the OCS, the PCEF restores the UE from offline charging to online charging, and the PCEF performs charging data record splitting, notifies the CG that the UE is restored to online charging, and stops the offline timer, Holding-Timer.

Step 617: After the PCEF restores the UE from offline charging to online charging, the control and charging policy of the UE needs to be restored again. Therefore, the PCEF sends a CCR-U message to the PCRF to notify the PCRF that the UE has been restored to online charging includes adding, to the CCR-U message using an extended Event-Trigger AVP, an event that the UE is restored to online charging.

Step 618: After receiving the CCR-U message sent by the PCEF, the PCRF restores the control and charging policy of the UE to the control and charging policy prior to the adjustment according to the event, carried in the Event-Trigger AVP in the message, that the UE is restored to online charging. The PCRF sends the restored control and charging policy to the PCEF using a CCA-U message.

Step 619: After receiving the CCA-U message sent by the PCRF, the PCEF restores the control and charging policy of the UE according to the CCA-U message, and notifies the CG that a subsequently generated offline charging data record in the online charging process no longer carries the switched-to-offline flag, that is, the offline charging data record generated in the online charging process is used only for account reconciliation, but not used as a fee deduction basis.

The following describes a method for subscribing to, by a PCRF from a PCEF, an event of switching from online charging to offline charging, and adjusting a control and charging policy of UE according to the event in an embodiment of the present disclosure.

Figure 7:
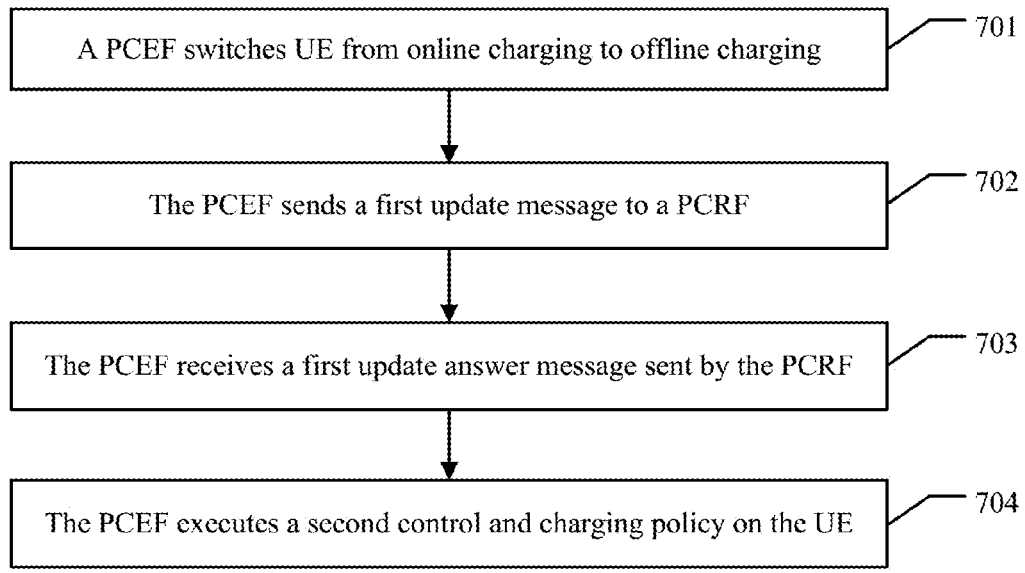
FIG. 7 is a flowchart of control and charging policy adjustment when online charging is switched to offline charging according to an embodiment of the present disclosure.

With reference to FIG. 7, a flowchart of control and charging policy adjustment when online charging is switched to offline charging, according to an embodiment of the present disclosure includes the following steps.

Step 701: A PCEF switches UE from online charging to offline charging.

As defined in the 3GPP protocol, when an OCS is unavailable, and in a process of performing online charging for the UE, when applying for a quota or report a used quota to the OCS, if the PCEF finds that the OCS is unavailable, the PCEF switches the UE from online charging to offline charging, thereby ensuring continuing use of a service and improving user experience.

Step 702: The PCEF sends a first update message to a PCRF.

When the PCEF switches the UE from online charging to offline charging, or after the PCEF switches the UE from online charging to offline charging, the PCEF interacts with the PCRF to obtain a control and charging policy. In this case, the PCEF sends the first update message to the PCRF to report, to the PCRF, an event that the UE is switched from online charging to offline charging. After receiving the first update message, the PCRF adjusts a first control and charging policy used by the UE during online charging to a second control and charging policy in order to mitigate a user account overdraft risk.

It should be noted that, the first update message sent by the PCEF to the PCRF may be a CCR-U message, or may be another message. This is not limited herein.

Step 703: The PCEF receives a first update answer message sent by the PCRF.

After the PCEF sends the first update message to the PCRF, the PCRF adjusts the first control and charging policy of the UE to the second control and charging policy. The PCRF sends the second control and charging policy to the PCEF using the first update answer message, and the PCEF receives the first update answer message sent by the PCRF.

It should be noted that, the first update answer message sent by the PCRF to the PCEF may be a CCA-U message, or may be another message. This is not limited herein.

Step 704: The PCEF executes a second control and charging policy on the UE.

After receiving the first update answer message sent by the PCRF, the PCEF executes the second control and charging policy on the UE in order to reduce a user account overdraft probability.

In this embodiment of the present disclosure, the PCEF sends an update message to the PCRF when online charging is switched to offline charging, and the PCRF adjusts a control and charging policy of the UE according to the update message such that the user account overdraft risk can be mitigated.

In a specific implementation, the PCEF sends the CCR-U message to the PCRF using a Gx interface for communication with the PCRF. The CCR-U message carries an Event-Trigger AVP. The Event-Trigger AVP is used to report an event to the PCRF such that the PCRF generates different control and charging policies according to different events. Parameter values of the Event-Trigger AVP are extended such that one of the parameter values is used to indicate an event of switching from online charging to offline charging, and the parameter value is referred to as a first parameter value. The PCRF generates a corresponding control and charging policy according to the first parameter value in the Event-Trigger AVP in the CCR-U message of the UE, and the control and charging policy is referred to as the second control and charging policy.

In a specific implementation, that the PCRF adjusts the first control and charging policy used by the UE during online charging to the second control and charging policy used during offline charging may include adjusting QoS in the control and charging policy. Further, the QoS in the control and charging policy is reduced. For example, a QoS parameter such as a stream service quality class of the UE, an uplink rate, a downlink rate, a bit error rate, a packet loss rate, a delay, a jitter, or a peak rate is controlled such that QoS in the second control and charging policy is lower than the QoS in the first control and charging policy, thereby mitigating the user account overdraft risk.

It should be noted that, when adjusting the first control and charging policy used by the UE during online charging to the second control and charging policy, in addition to adjusting the QoS in the control and charging policy, the PCRF may adjust another parameter in the control and charging policy, for example, adjust a charging rate to mitigate the user account overdraft risk. A specific adjustment method is not limited herein.

Further, in another embodiment, in an offline charging process, if the PCEF detects that the OCS becomes available, the PCEF re-sets up a session with the OCS, the PCEF restores the UE from offline charging to online charging, and the PCEF re-obtains a control and charging policy from the PCRF in order to restore the control and charging policy of the UE. A specific process is as follows.

After restoring the UE from offline charging to online charging, the PCEF interacts with the PCRF to obtain the control and charging policy in order to restore the control and charging policy of the UE.

The PCEF sends a second update message to the PCRF to report, to the PCRF, an event that the UE is restored to online charging. After receiving the second update message, the PCRF restores the second control and charging policy used by the UE during offline charging to the first control and charging policy used during online charging. Then the PCRF sends the first control and charging policy to the PCEF using a second update answer message, and the PCEF receives the second update answer message sent by the PCRF. After receiving the second update answer message sent by the PCRF, the PCEF executes the first control and charging policy on the UE in order to restore the control and charging policy used by the UE during online charging.

It should be noted that, the second update message sent by the PCEF to the PCRF may be a CCR-U message, or may be another message. This is not limited herein.

It should be noted that, the second update answer message sent by the PCRF to the PCEF may be a CCA-U message, or may be another message. This is not limited herein.

In a specific implementation, the PCEF sends the CCR-U message to the PCRF using the Gx interface for communication with the PCRF. A parameter value of an Event-Trigger AVP in the CCR-U message is extended such that the extended parameter value is used to indicate an online charging recovery event, and the parameter value is referred to as a second parameter value. The PCRF restores the control and charging policy of the UE to the first control and charging policy according to the second parameter value in the Event-Trigger AVP in the CCR-U message of the UE.

If the PCRF adjusts the control and charging policy by reducing the QoS of the UE when online charging is switched to offline charging, the PCRF restores the second control and charging policy of the UE to the first control and charging policy by restoring the QoS of the UE.

The foregoing describes a charging policy adjustment method in a charging process from the perspective of a PCEF, and the following describes, from the perspective of a PCRF, a method for subscribing to, by the PCRF from the PCEF, an event of switching from online charging to offline charging, and adjusting a control and charging policy of UE according to the event in an embodiment of the present disclosure.

Figure 8:
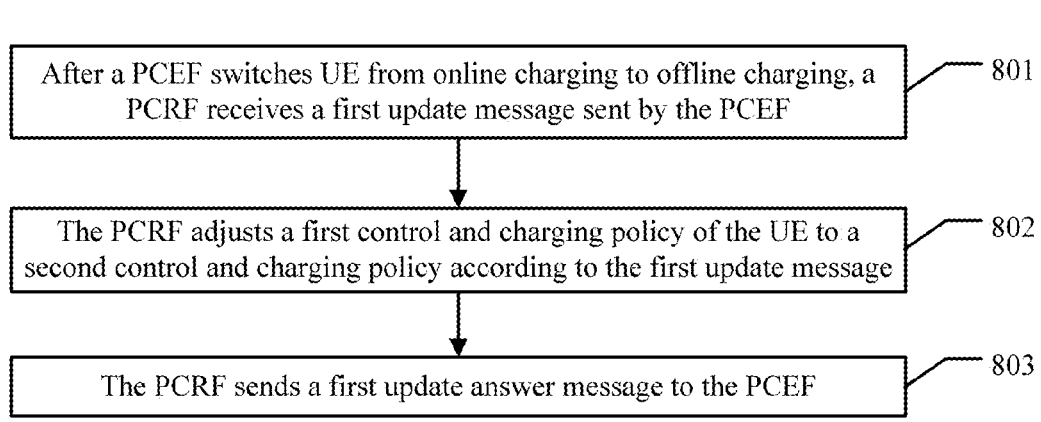
FIG. 8 is a flowchart of control and charging policy adjustment when offline charging is switched to online charging according to an embodiment of the present disclosure.

With reference to FIG. 8, a flowchart of control and charging policy adjustment when offline charging is switched to online charging, according to an embodiment of the present disclosure includes the following steps.

Step 801: After a PCEF switches UE from online charging to offline charging, a PCRF receives a first update message sent by the PCEF.

As defined in the 3GPP protocol, when an OCS is unavailable, and in a process of performing online charging for the UE, when applying for a quota or report a used quota to the OCS, if the PCEF finds that the OCS is unavailable, the PCEF switches the UE from online charging to offline charging, thereby ensuring continuing use of a service and improving user experience.

When the PCEF switches the UE from online charging to offline charging, or after the PCEF switches the UE from online charging to offline charging, the PCEF interacts with the PCRF to obtain a control and charging policy. In this case, the PCEF sends the first update message to the PCRF to report an event that the UE is switched from online charging to offline charging, and the PCRF receives the first update message sent by the PCEF.

It should be noted that, the first update message received by the PCRF may be a CCR-U message, or may be another message. This is not limited herein.

Step 802: The PCRF adjusts a first control and charging policy of the UE to a second control and charging policy according to the first update message.

After receiving the first update message sent by the PCEF, the PCRF adjusts the first control and charging policy used by the UE during online charging to the second control and charging policy in order to mitigate a user account overdraft risk.

Step 803: The PCRF sends a first update answer message to the PCEF.

After adjusting the first control and charging policy of the UE to the second control and charging policy, the PCRF sends the second control and charging policy to the PCEF using the first update answer message such that after receiving the first update answer message, the PCEF executes the second control and charging policy on the UE.

It should be noted that, the first update answer message sent by the PCRF to the PCEF may be a CCA-U message, or may be another message. This is not limited herein.

In this embodiment of the present disclosure, the PCRF receives an update message sent by the PCEF, the PCRF adjusts a control and charging policy of the UE according to the update message and then sends an adjusted control and charging policy to the PCEF, and the PCEF executes the adjusted control and charging policy on the UE such that the user account overdraft risk can be mitigated.

In a specific implementation, the PCRF receives, using a Gx interface for communication with the PCEF, the CCR-U message sent by the PCEF. The CCR-U message carries an Event-Trigger AVP. The Event-Trigger AVP is used to report an event to the PCRF such that the PCRF generates different control and charging policies according to different events. Parameter values of the Event-Trigger AVP are extended such that one of the parameter values is used to indicate an event of switching from online charging to offline charging, and the parameter value is referred to as a first parameter value. The PCRF generates a corresponding control and charging policy according to the first parameter value in the Event-Trigger AVP in the CCR-U message of the UE, and the control and charging policy is referred to as the second control and charging policy.

In a specific implementation, the PCRF adjusts the first control and charging policy used by the UE during online charging to the second control and charging policy used during offline charging may include adjusting QoS in the control and charging policy. Further, the QoS in the control and charging policy is reduced. For example, a QoS parameter such as a stream service quality class of the UE, an uplink rate, a downlink rate, a bit error rate, a packet loss rate, a delay, a jitter, or a peak rate is controlled such that QoS in the second control and charging policy is lower than the QoS in the first control and charging policy, thereby mitigating the user account overdraft risk.

It should be noted that, when adjusting the first control and charging policy used by the UE during online charging to the second control and charging policy, in addition to adjusting the QoS in the control and charging policy, the PCRF may adjust another parameter in the control and charging policy, for example, adjust a charging rate to mitigate the user account overdraft risk. A specific adjustment method is not limited herein.

Further, in another embodiment, in an offline charging process, if the PCEF restores the UE from offline charging to online charging, the PCEF re-obtains a control and charging policy from the PCRF in order to restore the control and charging policy of the UE. A specific process is as follows.

The PCRF receives a second update message sent by the PCEF, and a function of the message is reporting, to the PCRF, an event that the UE is restored to online charging. After receiving the second update message, the PCRF restores the second control and charging policy used by the UE during offline charging to the first control and charging policy used during online charging. Then the PCRF sends the first control and charging policy to the PCEF using a second update answer message, and the PCEF receives the second update answer message sent by the PCRF such that the PCEF executes the first control and charging policy on the UE in order to restore the control and charging policy used by the UE during online charging.

It should be noted that, the second update message received by the PCRF from the PCEF may be a CCR-U message, or may be another message. This is not limited herein.

It should be noted that, the second update answer message sent by the PCRF to the PCEF may be a CCA-U message, or may be another message. This is not limited herein.

In a specific implementation, the PCRF receives, using the Gx interface for communication with the PCEF, the CCR-U message sent by the PCEF. A parameter value of an Event-Trigger AVP in the CCR-U message is extended such that the extended parameter value is used to indicate an online charging recovery event, and the parameter value is referred to as a second parameter value. The PCRF restores the control and charging policy of the UE to the first control and charging policy according to the second parameter value in the Event-Trigger AVP in the CCR-U message of the UE.

If the PCRF adjusts the control and charging policy by reducing QoS of the UE when online charging is switched to offline charging, the PCEF restores the second control and charging policy of the UE to the first control and charging policy by restoring the QoS of the UE.

Figure 9:
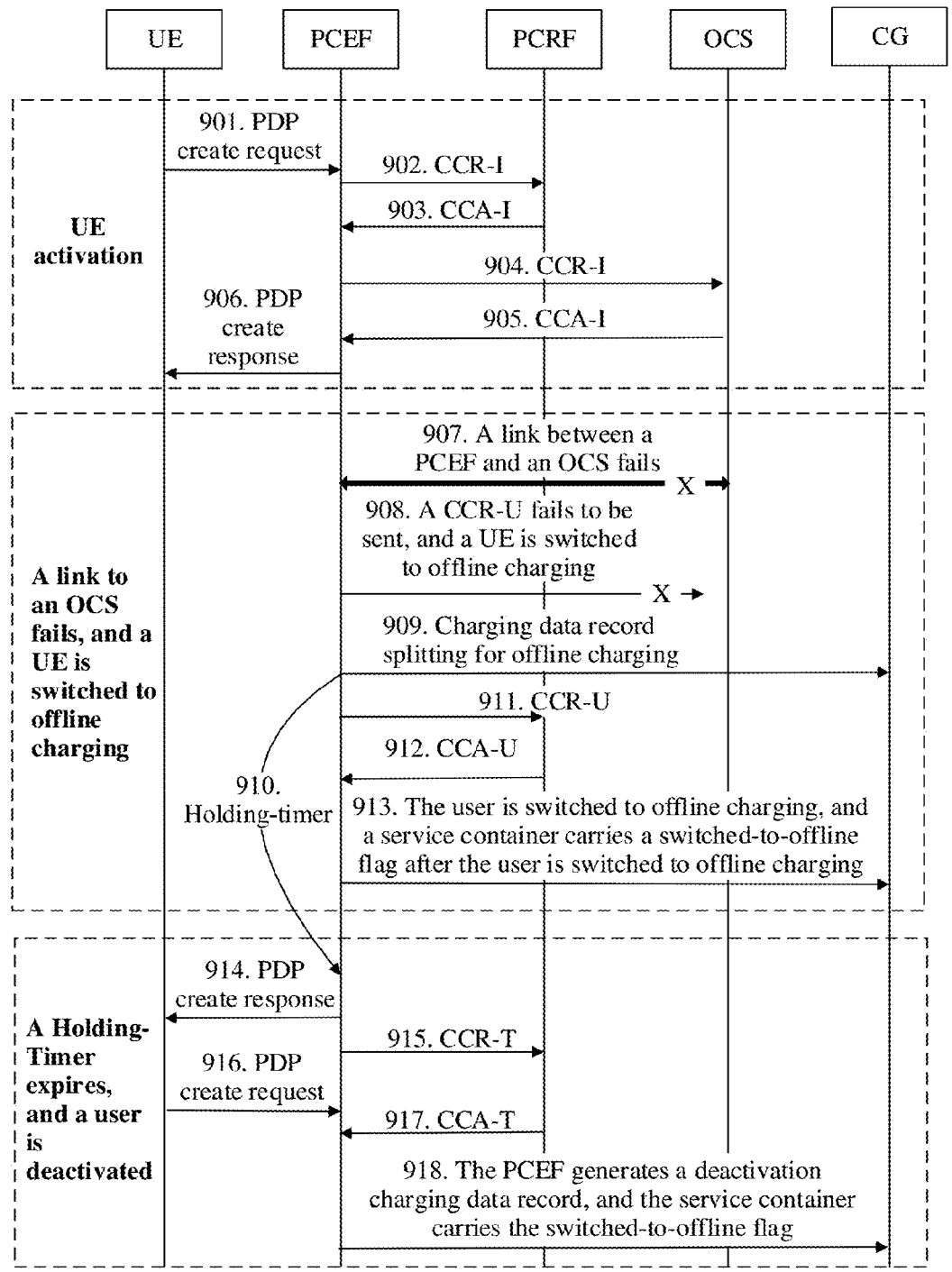
FIG. 9 is a signaling interworking flowchart of control and charging policy adjustment when online charging is switched to offline charging according to an embodiment of the present disclosure.

As shown in FIG. 9, the following flowchart describes in detail, signaling interworking between network elements during charging policy adjustment in an offline charging process in an embodiment of the present disclosure.

Step 901 to step 906 are a UE activation process and are the same as step 501 to step 506 in the embodiment shown in FIG. 5, and details are not described herein again.

Step 907: After the UE is successfully activated, the PCEF performs online charging for a service used by the UE, and a communication link between the PCEF and the OCS fails in this process.

Step 908: In an online charging process, the PCEF sends a CCR-U message to the OCS in real time to apply for a quota or report a used quota. When the communication link between the PCEF and the OCS fails, and the CCR-U message fails to be sent, the PCEF switches the UE to offline charging processing, and the UE is switched from online charging to offline charging.

Step 909: When switching the UE from online charging to offline charging, the PCEF performs charging data record splitting to notify a CG that the UE enters offline charging.

Step 910: The PCEF starts an offline timer, Holding-Timer, where the Holding-Timer is configured to set duration for offline charging of the UE, that is, a maximum time from offline charging to deactivation for the UE. When the offline timer expires, a user is deactivated, and a service currently used by the user is interrupted.

Step 911: After the PCEF switches the UE from online charging to offline charging to mitigate an account overdraft risk of the user in an offline charging process, the PCEF sends a CCR-U message to the PCRF, where the CCR-U message carries, using an extended Event-Trigger AVP, an event that the UE is switched from online charging to offline charging.

Step 912: After receiving the CCR-U message sent by the PCEF, the PCRF adjusts the control and charging policy of the UE according to the event, carried in the Event-Trigger AVP in the message, that the UE is switched from online charging to offline charging. Further, QoS of the UE may be reduced. The PCRF sends an adjusted control and charging policy to the PCEF using a CCA-U message.

Step 913: After receiving the CCA-U message, the PCEF executes the adjusted control and charging policy on the UE. During a period in which the user is in offline charging, each offline charging data record generated by the PCEF (i.e., a service container) carries a switched-to-offline flag, and the PCEF sends the charging data record carrying the switched-to-offline flag to the CG to complete offline charging. The switched-to-offline flag is used to identify that a BS needs to perform differential charging processing on the offline charging data record, that is, to perform complementary fee deduction.

Step 914: The Holding-Timer expires, and the PCEF initiates a user deactivation message (i.e., PDP Create response) to the UE.

Step 915: The Holding-Timer expires, and the PCEF sends a credit-control-request terminate (CCR-T) message to the PCRF to terminate information exchange with the PCRF.

Step 916: After receiving the PDP Create response message, the UE sends a PDP Create request message to the PCEF.

Step 917: After receiving the CCR-T message sent by the PCEF, the PCRF returns a credit-control-answer terminate (CCA-T) message to the PCEF in response to the PCEF.

Step 918: The PCEF generates a deactivation charging data record and sends the deactivation charging data record to the CG, where the deactivation charging data record (i.e., the service container) still carries the switched-to-offline flag.

The foregoing describes the charging method in the embodiment of the present disclosure, and the following describes a network device in an embodiment of the present disclosure from the perspective of a modular functional entity.

Figure 10:
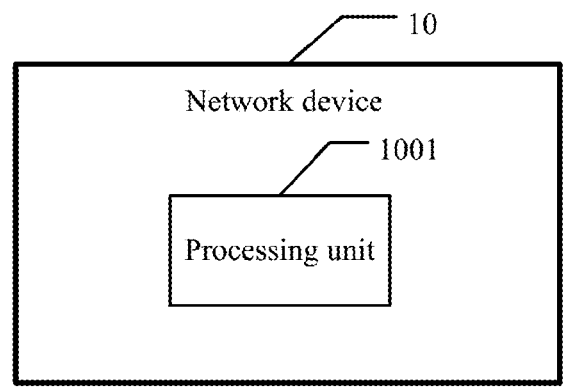
FIG. 10 is a schematic diagram of an embodiment of a network device according to an embodiment of the present disclosure.

With reference to FIG. 10, a schematic diagram of an embodiment of a network device 10, according to an embodiment of the present disclosure includes a processing unit 1001 configured to perform online charging for the UE, and learn that an OCS is unavailable, switch the UE from online charging to offline charging, and start an offline timer, where the offline timer is configured to indicate a maximum time from offline charging to deactivation for the UE, and restore the UE from offline charging to online charging if the PCEF learns, before the offline timer expires, that the OCS becomes available.

The following describes interaction between units or modules in the network device 10 of the present disclosure using a specific application scenario.

In a UE activation process, the UE sends a service request to the network device 10, and after the network device 10 receives the service request of the UE, the processing unit 1001 in the network device 10 interacts with the OCS to perform activation authentication in order to complete UE activation.

After the UE is activated, the processing unit 1001 interacts with the OCS to start to perform online charging for the UE. In an online charging process, the UE uses the processing unit 1001 to apply for a quota or report a used quota to the OCS, and the OCS can control, by means of quota management and real-time quota delivery, a user account status corresponding to the UE in order to perform real-time credit control on a service used by a user.

When the processing unit 1001 applies for the quota or reports the used quota to the OCS in the online charging process, if the quota application or the quota reporting fails due to an OCS failure or for another reason, the processing unit 1001 may learn that the OCS is unavailable.

When the processing unit 1001 learns that the OCS is unavailable, the processing unit 1001 switches the UE from online charging to offline charging, thereby ensuring continuing use of a service and improving user experience. However, to avoid an account overdraft caused when the user who is switched to offline charging uses the service for a long time, the processing unit 1001 sets the offline timer when switching the UE from online charging to offline charging. The offline timer is configured to set duration for offline charging of the UE, that is, a maximum time from offline charging to deactivation for the UE. When the offline timer expires, the UE is deactivated, and a service currently used by the user is interrupted.

In an offline charging process, the processing unit 1001 attempts to restore communication with the OCS, and if the processing unit 1001 learns, before the offline timer expires, that the OCS becomes available, it indicates that the OCS can interact with the network device 10 to implement an online charging function. Therefore, the processing unit 1001 restores the UE from offline charging to online charging such that the system recovers the online charging function without interrupting the service currently used by the user.

Therefore, after the network device 10 receives a success response message of the OCS, the processing unit 1001 in the network device 10 restores the UE from offline charging to online charging such that the system recovers the online charging function without interrupting the service currently used by the user.

In this embodiment of the present disclosure, if the processing unit 1001 learns, in the process of performing online charging for the UE, that the OCS is unavailable, the processing unit 1001 switches the UE from online charging to offline charging, and starts the offline timer. Then, if the processing unit 1001 learns, before the timer expires, that the OCS becomes available, the processing unit 1001 restores the UE from offline charging to online charging, instead of performing an operation in which the processing unit 1001 stops offline charging for the UE and deactivates the UE after the offline timer expires. Therefore, according to the solution, after the user is switched to offline charging, the online charging function can be recovered in a timely manner when the OCS becomes available. In this way, a user account overdraft risk possibly existing in the offline charging process is mitigated, and deactivation of the user can be avoided in the solution, thereby improving user experience.

Figure 11:
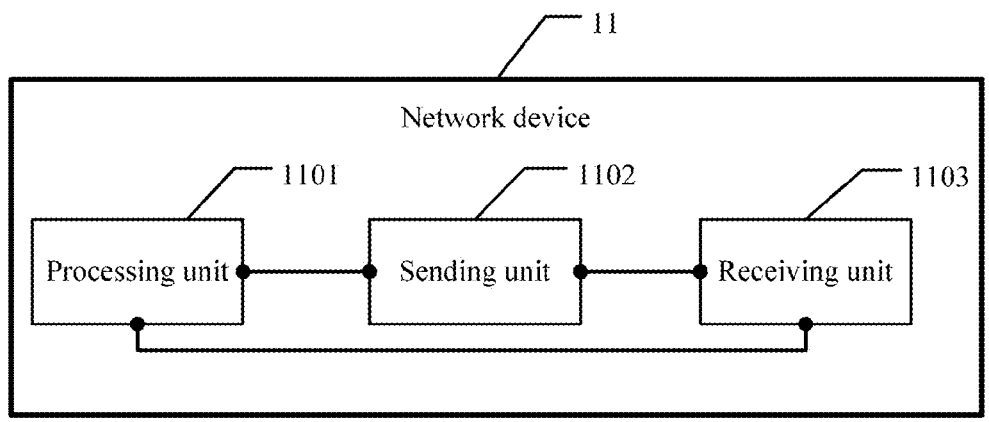
FIG. 11 is a schematic diagram of another embodiment of a network device according to an embodiment of the present disclosure.

With reference to FIG. 11, a schematic diagram of another embodiment of a network device 11, according to an embodiment of the present disclosure includes a processing unit 1101 configured to perform online charging for the UE, and learn that an OCS is unavailable, switch the UE from online charging to offline charging, and start an offline timer, where the offline timer is configured to indicate a maximum time from offline charging to deactivation for the UE, and restore the UE from offline charging to online charging if the PCEF learns, before the offline timer expires, that the OCS becomes available, a sending unit 1102 configured to send a request message to the OCS, and a receiving unit 1103 configured to receive a success response message sent by the OCS, where the success response message is a response to the request message, and is used to indicate that the OCS has become available.

The sending unit 1102 is further configured to send a first update message to a PCRF after the processing unit 1101 switches the UE from online charging to offline charging, where the first update message is used to indicate that the UE has been switched to offline charging.

The receiving unit 1103 is further configured to receive a first update answer message sent by the PCRF, where the first update answer message carries a second control and charging policy, and the second control and charging policy is a control and charging policy that is of the UE and that is adjusted by the PCRF according to the first update message.

The processing unit 1101 is further configured to execute the second control and charging policy on the UE.

The sending unit 1102 is further configured to send a second update message to the PCRF after the processing unit 1101 restores the UE from offline charging to online charging, where the second update message is used to indicate that the UE has been restored to online charging.

The receiving unit 1103 is further configured to receive a second update answer message sent by the PCEF, where the second update answer message carries a first control and charging policy, and the first control and charging policy is a control and charging policy that is of the UE and that is restored by the PCRF according to the second update message.

When the processing unit 1101 is further configured to learn that a link between the network device 11 and the OCS fails, the sending unit 1102 is further configured to send the request message to the OCS after it is perceived that a failure in the link between the network device 11 and the OCS is rectified, or when the processing unit 1101 is further configured to learn that the OCS makes no response, or receive an error code sent by the OCS, the sending unit 1102 is further configured to regularly send the request message to the OCS.

The following describes interaction between units or modules in the network device 11 of the present disclosure using a specific application scenario.

In a UE activation process, the UE sends a service request to the network device 11, and after the receiving unit 1103 receives the service request of the UE, the processing unit 1101 interacts with the OCS to perform activation authentication, and interacts with the PCRF to obtain a control and charging policy in order to complete UE activation.

A control and charging policy used by the UE in an online charging process is referred to as a first control and charging policy.

After the UE is activated, the processing unit 1101 in the network device 11 interacts with the OCS to start to perform online charging for the UE. In the online charging process, the UE uses the network device 11 to apply for a quota or report a used quota to the OCS, and the OCS can control, by means of quota management and real-time quota delivery, a user account status corresponding to the UE in order to perform real-time credit control on a service used by a user.

When the processing unit 1101 applies for the quota or reports the used quota to the OCS in the online charging process, if the quota application or the quota reporting fails due to an OCS failure or for another reason, the processing unit 1101 may learn that the OCS is unavailable.

Further, there may be the following several scenarios of OCS unavailability.

1. A communication link between the network device 11 and the OCS fails.

When the sending unit 1102 sends a message to the OCS to apply for the quota or report the used quota, if the processing unit 1101 detects that the communication link between the network device 11 and the OCS fails, the processing unit 1101 may determine that the OCS is unavailable.

It should be noted that the processing unit 1101 detects that the communication link between the network device 11 and the OCS fails is in the other approaches. Further, detection may be performed using a heartbeat packet, and details are not described herein.

2. The OCS makes no response after receiving a message sent by the PCEF.

When the OCS fails, and the sending unit 1102 sends the message to the OCS to apply for the quota or report the used quota, if the receiving unit 1103 has not received, within a predetermined time, a response message sent by the OCS, the processing unit 1101 may determine that the OCS is unavailable.

3. The OCS returns an error code.

When overloaded, the OCS sends the error code (i.e., Result-Code) to notify the network device 11 that the OCS cannot process a service currently. When the receiving unit 1103 receives the Result-Code, the processing unit 1101 may determine that the OCS is unavailable.

It should be noted that, in addition to the foregoing three cases, there may be other cases of OCS unavailability. This is not limited herein.

When applying for the quota or reporting the used quota to the OCS, if the processing unit 1101 finds that the OCS is unavailable, the processing unit 1101 switches the UE from online charging to offline charging, thereby ensuring continuing use of a service and improving user experience. However, to avoid an account overdraft caused when the user who is switched to offline charging uses the service for a long time, the processing unit 1101 sets the offline timer when switching the UE from online charging to offline charging. The offline timer is configured to set duration for offline charging of the UE, that is, a maximum time from offline charging to deactivation for the UE. When the offline timer expires, the UE is deactivated, and a service currently used by the user is interrupted.

When the processing unit 1101 switches the UE from online charging to offline charging, or after the processing unit 1101 switches the UE from online charging to offline charging, the processing unit 1101 interacts with the PCRF to obtain a control and charging policy. In this case, the sending unit 1102 sends the first update message to the PCRF to report, to the PCRF, an event that the UE is switched from online charging to offline charging. After receiving the first update message, the PCRF adjusts the first control and charging policy used by the UE during online charging to a second control and charging policy in order to mitigate a user account overdraft risk.

It should be noted that, the first update message sent by the sending unit 1102 to the PCRF may be a CCR-U message, or may be another message. This is not limited herein.

In a specific implementation, the sending unit 1102 sends the CCR-U message to the PCRF using a Gx interface for communication with the PCRF. The CCR-U message carries an Event-Trigger AVP. The Event-Trigger AVP is used to report an event to the PCRF such that the PCRF generates different control and charging policies according to different events. Parameter values of the Event-Trigger AVP are extended such that one of the parameter values is used to indicate an event of switching from online charging to offline charging, and the parameter value is referred to as a first parameter value. The PCRF generates a corresponding control and charging policy according to the first parameter value in the Event-Trigger AVP in the CCR-U message of the UE, and the control and charging policy is referred to as the second control and charging policy.

In a specific implementation, that the PCRF adjusts the first control and charging policy used by the UE during online charging to the second control and charging policy used during offline charging may be adjusting QoS in the control and charging policy. Further, the QoS in the control and charging policy is reduced. For example, a QoS parameter such as a stream service quality class of the UE, an uplink rate, a downlink rate, a bit error rate, a packet loss rate, a delay, a jitter, or a peak rate is controlled such that QoS in the second control and charging policy is lower than the QoS in the first control and charging policy, thereby mitigating the user account overdraft risk.

It should be noted that, when adjusting the first control and charging policy used by the UE during online charging to the second control and charging policy, in addition to adjusting the QoS in the control and charging policy, the PCRF may adjust another parameter in the control and charging policy, for example, adjust a charging rate to mitigate the user account overdraft risk. A specific adjustment method is not limited herein.

After the sending unit 1102 sends the first update message to the PCRF, the PCRF adjusts the first control and charging policy of the UE to the second control and charging policy. Then the PCRF sends the second control and charging policy to the receiving unit 1103 in the network device 11 using the first update answer message, and the receiving unit 1103 receives the first update answer message sent by the PCRF.

It should be noted that, the first update answer message sent by the PCRF to the receiving unit 1103 in the network device 11 may be a CCA-U message, or may be another message. This is not limited herein.

After the receiving unit 1103 receives the first update answer message sent by the PCRF, the processing unit 1101 executes the second control and charging policy on the UE.

If the PCRF adjusts the control and charging policy by reducing QoS of the UE, the QoS of the UE in an offline charging process is reduced after the processing unit 1101 executes the second control and charging policy on the UE, thereby mitigating the user account overdraft risk.

After the processing unit 1101 switches the UE from online charging to offline charging, and before the offline timer expires, the sending unit 1102 sends the request message to the OCS to re-set up a session with the OCS.

In a specific implementation, the sending unit 1102 sends the request message to the OCS in the following manners.

Manner 1: The sending unit 1102 sends the request message to the OCS immediately when the processing unit 1101 perceives that the OCS is available.

When the link between the network device 11 and the OCS fails, the processing unit 1101 determines that the OCS is unavailable. In this case, if the processing unit 1101 perceives that a failure in the link between the network device 11 and the OCS is rectified, the sending unit 1102 immediately sends the request message to the OCS to re-set up the session with the OCS.

The processing unit 1101 perceives that the failure in the link between the network device 11 and the OCS is rectified in the other approaches. Further, detection may be performed using a heartbeat packet, and details are not described herein.

Manner 2: The processing unit 1101 regularly sends the request message to the OCS.

When the OCS makes no response or the receiving unit 1103 receives the error code (i.e., Result-Code) returned by the OCS, the processing unit 1101 determines that the OCS is unavailable. In this case, the sending unit 1102 regularly sends the request message to the OCS to re-set up the session with the OCS.

It should be noted that, in addition to the foregoing three cases, there may be other cases of OCS unavailability. For the other unavailability cases, processing may also be performed with reference to the foregoing manners.

The processing unit 1101 detects that the failure in the link between the network device 11 and the OCS is rectified in the other approaches, and details are not described herein.

In a specific implementation, the request message sent by the sending unit 1102 to the OCS may be a CCR-I message.

After the sending unit 1102 sends the request message to the OCS to re-set up the session, if the receiving unit 1103 receives, before the offline timer expires, the success response message sent by the OCS, it indicates that the OCS has become available, and can interact with the network device 11 to implement an online charging function, where the success response message is a response of the OCS to the request message sent by the PCEF.

Therefore, after the receiving unit 1103 receives the success response message of the OCS, the processing unit 1101 restores the UE from offline charging to online charging such that the system recovers the online charging function without interrupting the service currently used by the user.

In a specific implementation, the success response message sent by the sending unit 1102 to the OCS may be a CCA-I message.

After restoring the UE from offline charging to online charging, the processing unit 1101 interacts with the PCRF to obtain the control and charging policy in order to restore the control and charging policy of the UE.

The sending unit 1102 sends the second update message to the PCRF to report, to the PCRF, an event that the UE is restored to online charging. After receiving the second update message, the PCRF restores the second control and charging policy used by the UE during offline charging to the first control and charging policy used during online charging.

It should be noted that, the second update message sent by the sending unit 1102 to the PCRF may be a CCR-U message, or may be another message. This is not limited herein.

In a specific implementation, the sending unit 1102 sends the CCR-U message to the PCRF using the Gx interface for communication with the PCRF. A parameter value of an Event-Trigger AVP in the CCR-U message is extended such that the extended parameter value is used to indicate an online charging recovery event, and the parameter value is referred to as a second parameter value. The PCRF restores the control and charging policy of the UE to the first control and charging policy according to the second parameter value in the Event-Trigger AVP in the CCR-U message of the UE.

If the PCRF adjusts the control and charging policy by reducing the QoS of the UE when online charging is switched to offline charging, the PCRF restores the second control and charging policy of the UE to the first control and charging policy by restoring the QoS of the UE.

After the sending unit 1102 sends the second update message to the PCRF, the PCRF restores the second control and charging policy of the UE to the first control and charging policy. Then the PCRF sends the first control and charging policy to the network device 11 using the second update answer message, and the receiving unit 1103 in the network device 11 receives the second update answer message sent by the PCRF.

It should be noted that, the second update answer message sent by the sending unit 1102 to the PCEF may be a CCA-U message, or may be another message. This is not limited herein.

After the receiving unit 1103 receives the second update answer message sent by the PCRF, the processing unit 1101 executes the first control and charging policy on the UE in order to restore the control and charging policy used by the UE during online charging.

If the PCRF further adjusts the control and charging policy of the UE by reducing the QoS in the control and charging policy when online charging is switched to offline charging, the QoS of the UE is restored after the processing unit 1101 executes the first control and charging policy on the UE.

In this embodiment of the present disclosure, when the processing unit 1101 switches the UE from online charging to offline charging or recovers online charging, the sending unit 1102 sends, to the PCRF, an update message that carries the event of switching from online charging to offline charging or the online charging recovery event, and the PCRF adjusts the control and charging policy of the UE according to the message, thereby further mitigating the user account overdraft risk.

Then, in this embodiment of the present disclosure, the user does not need to be deactivated. On the premise that the user who is switched to offline charging is not deactivated (not offline), online charging can be recovered only by means of signaling interworking between the network device and the OCS such that signaling overheads can be reduced.

Further, in specific implementation, when switching the UE from online charging to offline charging, the processing unit 1101 is further configured to perform charging data record splitting to generate an offline charging data record, where the offline charging data record carries a switched-to-offline flag, and the switched-to-offline flag is used to identify that a BS performs differential charging processing on the offline charging data record, and when restoring the UE from offline charging to online charging, the processing unit 1101 is further configured to perform charging data record splitting such that a newly generated offline charging data record no longer carries the switched-to-offline flag.

The following uses a specific application scenario for description.

In a process in which the processing unit 1101 switches the UE from online charging to offline charging, the processing unit 1101 performs charging data record splitting, and the charging data record splitting is considered as a first time of charging data record splitting. After the first time of charging data record splitting, each charging data record subsequently generated in the offline charging process carries the switched-to-offline flag, and the switched-to-offline flag is used to identify that a BS needs to perform differential processing on the offline charging data record, that is, to perform complementary fee deduction.

After the receiving unit 1103 receives the success response message sent by the OCS, the processing unit 1101 restores the UE from offline charging to online charging. In this process, the processing unit 1101 performs charging data record splitting, and the charging data record splitting is considered as a second time of charging data record splitting. After the second time of charging data record splitting, a subsequently generated offline charging data record no longer carries the switched-to-offline flag, and it indicates that in subsequent online charging, the subsequently generated offline charging data record is used only for account reconciliation, but not used as a fee deduction basis.

In this embodiment of the present disclosure, when online charging is switched to offline charging or online charging is recovered, by means of charging data record splitting of the processing unit 1101, the charging data record generated during offline charging carries the switched-to-offline flag, thereby implementing complementary fee deduction on the charging data record in the offline charging process, and improving implementability of the solution.

The foregoing describes application of the network device to online charging auto-recovery in the embodiment of the present disclosure, and the following describes application of the network device to control and charging policy adjustment.

Figure 12:
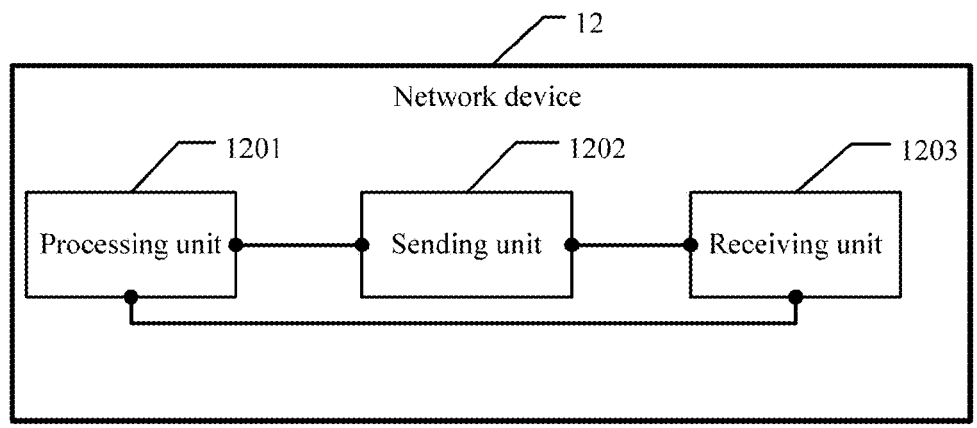
FIG. 12 is a schematic diagram of another embodiment of a network device according to an embodiment of the present disclosure.

With reference to FIG. 12, a schematic diagram of another embodiment of a network device 12, according to an embodiment of the present disclosure includes a processing unit 1201 configured to switch UE from online charging to offline charging, a sending unit 1202 configured to send a first update message to a PCRF, where the first update message is used to indicate that the UE has been switched to offline charging, and a receiving unit 1203 configured to receive a first update answer message sent by the PCRF, where the first update answer message carries a second control and charging policy, and the second control and charging policy is a control and charging policy that is of the UE and that is adjusted by the PCRF according to the first update message.

The processing unit 1201 is further configured to execute the second control and charging policy on the UE.

The following describes interaction between units or modules in the network device of the present disclosure using a specific application scenario.

As defined in the 3GPP protocol, when an OCS is unavailable, and in a process of performing online charging for the UE, when applying for a quota or report a used quota to the OCS, if the network device 12 finds that the OCS is unavailable, the processing unit 1201 in the network device 12 switches the UE from online charging to offline charging, thereby ensuring continuing use of a service and improving user experience.

When the processing unit 1201 switches the UE from online charging to offline charging, or after the PCEF switches the UE from online charging to offline charging, the processing unit 1201 interacts with the PCRF to obtain a control and charging policy. In this case, the sending unit 1202 sends the first update message to the PCRF to report, to the PCRF, an event that the UE is switched from online charging to offline charging. After receiving the first update message, the PCRF adjusts a first control and charging policy used by the UE during online charging to a second control and charging policy in order to mitigate a user account overdraft risk.

It should be noted that, the first update message sent by the sending unit 1202 to the PCRF may be a CCR-U message, or may be another message. This is not limited herein.

After the sending unit 1202 sends the first update message to the PCRF, the PCRF adjusts the first control and charging policy of the UE to the second control and charging policy. The PCRF sends the second control and charging policy to the receiving unit 1203 in the network device 12 using the first update answer message, and the receiving unit 1203 receives the first update answer message sent by the PCRF.

It should be noted that, the first update answer message sent by the sending unit 1202 to the PCEF may be a CCA-U message, or may be another message. This is not limited herein.

After the receiving unit 1203 receives the first update answer message sent by the PCRF, the processing unit 1201 executes the second control and charging policy on the UE in order to reduce a user account overdraft probability.

In this embodiment of the present disclosure, the sending unit 1202 sends an update message to the PCRF when the processing unit 1201 switches the UE from online charging to offline charging, and the PCRF adjusts a control and charging policy of the UE according to the update message such that the user account overdraft risk can be mitigated.

In a specific implementation, the sending unit 1202 sends the CCR-U message to the PCRF using a Gx interface for communication with the PCRF. The CCR-U message carries an Event-Trigger AVP. The Event-Trigger AVP is used to report an event to the PCRF such that the PCRF generates different control and charging policies according to different events. Parameter values of the Event-Trigger AVP are extended such that one of the parameter values is used to indicate an event of switching from online charging to offline charging, and the parameter value is referred to as a first parameter value. The PCRF generates a corresponding control and charging policy according to the first parameter value in the Event-Trigger AVP in the CCR-U message of the UE, and the control and charging policy is referred to as the second control and charging policy.

In a specific implementation, the PCRF adjusts the first control and charging policy used by the UE during online charging to the second control and charging policy used during offline charging may include adjusting QoS in the control and charging policy. Further, the QoS in the control and charging policy is reduced. For example, a QoS parameter such as a stream service quality class of the UE, an uplink rate, a downlink rate, a bit error rate, a packet loss rate, a delay, a jitter, or a peak rate is controlled such that QoS in the second control and charging policy is lower than the QoS in the first control and charging policy, thereby mitigating the user account overdraft risk.

It should be noted that, when adjusting the first control and charging policy used by the UE during online charging to the second control and charging policy, in addition to adjusting the QoS in the control and charging policy, the PCRF may adjust another parameter in the control and charging policy, for example, adjust a charging rate to mitigate the user account overdraft risk. A specific adjustment method is not limited herein.

Further, in specific implementation, the sending unit 1202 is further configured to send a second update message to the PCRF after the UE is restored from offline charging to online charging, where the second update message is used to indicate that the UE has been restored to online charging. The receiving unit 1203 is further configured to receive a second update answer message sent by the PCRF, where the second update answer message carries the first control and charging policy, and the second update message is used to indicate that the UE has been restored to online charging, and the processing unit 1201 is further configured to execute the first control and charging policy on the UE.

The following uses a specific application scenario for description.

After restoring the UE from offline charging to online charging, the processing unit 1201 interacts with the PCRF to obtain the control and charging policy in order to restore the control and charging policy of the UE.

The sending unit 1202 sends the second update message to the PCRF to report, to the PCRF, an event that the UE is restored to online charging. After receiving the second update message, the PCRF restores the second control and charging policy used by the UE during offline charging to the first control and charging policy used during online charging. Then the PCRF sends the first control and charging policy to the PCEF using the second update answer message, and the PCEF receives the second update answer message sent by the PCRF. After receiving the second update answer message sent by the PCRF, the PCEF executes the first control and charging policy on the UE in order to restore the control and charging policy used by the UE during online charging.

It should be noted that, the second update message sent by the sending unit 1202 to the PCRF may be a CCR-U message, or may be another message. This is not limited herein.

It should be noted that, the second update answer message sent by the PCRF to the PCEF may be a CCA-U message, or may be another message. This is not limited herein.

In a specific implementation, the sending unit 1202 sends the CCR-U message to the PCRF using the Gx interface for communication with the PCRF. A parameter value of an Event-Trigger AVP in the CCR-U message is extended such that the extended parameter value is used to indicate an online charging recovery event, and the parameter value is referred to as a second parameter value. The PCRF restores the control and charging policy of the UE to the first control and charging policy according to the second parameter value in the Event-Trigger AVP in the CCR-U message of the UE.

If the PCRF adjusts the control and charging policy by reducing the QoS of the UE when online charging is switched to offline charging, the PCRF restores the second control and charging policy of the UE to the first control and charging policy by restoring the QoS of the UE.

The following describes another network device in an embodiment of the present disclosure.

Figure 13:
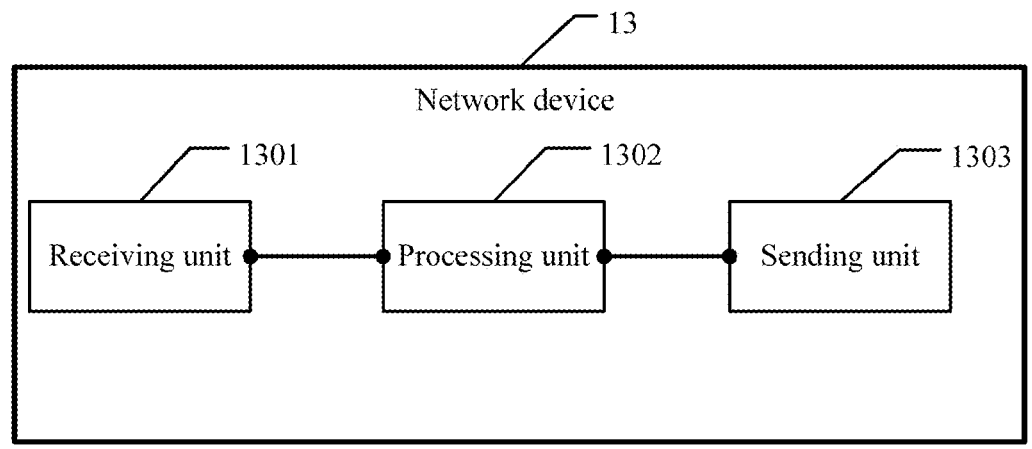
FIG. 13 is a schematic diagram of another embodiment of a network device according to an embodiment of the present disclosure.

With reference to FIG. 13, a schematic diagram of another embodiment of a network device 13, according to an embodiment of the present disclosure includes a receiving unit 1301 configured to receive a first update message sent by the PCEF after a PCEF switches UE from online charging to offline charging, where the first update message is used to indicate that the UE has been switched to offline charging, a processing unit 1302 configured to adjust a first control and charging policy of the UE to a second control and charging policy according to the first update message received by the receiving unit 1301, and a sending unit 1303 configured to send a first update answer message to the PCEF, where the first update answer message carries the second control and charging policy such that after receiving the first update answer message, the PCEF executes the second control and charging policy on the UE.

The following describes interaction between units or modules in the network device 13 of the present disclosure using a specific application scenario.

As defined in the 3GPP protocol, when an OCS is unavailable, and in a process of performing online charging for the UE, when applying for a quota or report a used quota to the OCS, if the PCEF finds that the OCS is unavailable, the PCEF switches the UE from online charging to offline charging, thereby ensuring continuing use of a service and improving user experience.

When the PCEF switches the UE from online charging to offline charging, or after the PCEF switches the UE from online charging to offline charging, the PCEF interacts with the network device 13 to obtain a control and charging policy. In this case, the PCEF sends the first update message to the network device 13 to report an event that the UE is switched from online charging to offline charging, and the receiving unit 1301 in the network device 13 receives the first update message sent by the PCEF.

It should be noted that, the first update message received by the receiving unit 1301 may be a CCR-U message, or may be another message. This is not limited herein.

After the receiving unit 1301 receives the first update message sent by the PCEF, the processing unit 1302 adjusts the first control and charging policy used by the UE during online charging to the second control and charging policy in order to mitigate a user account overdraft risk.

After the processing unit 1302 adjusts the first control and charging policy of the UE to the second control and charging policy, the sending unit 1303 sends the second control and charging policy to the PCEF using the first update answer message such that after receiving the first update answer message, the PCEF executes the second control and charging policy on the UE.

It should be noted that, the first update answer message sent by the sending unit 1303 to the PCEF may be a CCA-U message, or may be another message. This is not limited herein.

In this embodiment of the present disclosure, the receiving unit 1301 in the network device 13 receives an update message sent by the PCEF, the processing unit 1302 adjusts a control and charging policy of the UE according to the update message, then the sending unit 1303 sends an adjusted control and charging policy to the PCEF, and the PCEF executes the adjusted control and charging policy on the UE such that the user account overdraft risk can be mitigated.

In a specific implementation, the receiving unit 1301 receives, using a Gx interface for communication with the PCEF, the CCR-U message sent by the PCEF. The CCR-U message carries an Event-Trigger AVP. The Event-Trigger AVP is used to report an event to the processing unit 1302 in the network device 13 such that the processing unit 1302 in the network device 13 generates different control and charging policies according to different events. Parameter values of the Event-Trigger AVP are extended such that one of the parameter values is used to indicate an event of switching from online charging to offline charging, and the parameter value is referred to as a first parameter value. The processing unit 1302 generates a corresponding control and charging policy according to the first parameter value in the Event-Trigger AVP in the CCR-U message of the UE, and the control and charging policy is referred to as the second control and charging policy.

In a specific implementation, the processing unit 1302 adjusts the first control and charging policy used by the UE during online charging to the second control and charging policy used during offline charging may include adjusting QoS in the control and charging policy. Further, the QoS in the control and charging policy is reduced. For example, a QoS parameter such as a stream service quality class of the UE, an uplink rate, a downlink rate, a bit error rate, a packet loss rate, a delay, a jitter, or a peak rate is controlled such that QoS in the second control and charging policy is lower than the QoS in the first control and charging policy, thereby mitigating the user account overdraft risk.

It should be noted that, when adjusting the first control and charging policy used by the UE during online charging to the second control and charging policy, in addition to adjusting the QoS in the control and charging policy, the processing unit 1302 may adjust another parameter in the control and charging policy, for example, adjust a charging rate to mitigate the user account overdraft risk. A specific adjustment method is not limited herein.

Further, in a specific implementation, the receiving unit 1301 is further configured to receive a second update message sent by the PCEF after the PCEF restores the UE from offline charging to online charging, where the second update message is used to indicate that the UE has been restored to online charging, the processing unit 1302 is further configured to restore the second control and charging policy of the UE to the first control and charging policy according to the second update message received by the receiving unit 1301, and the sending unit 1303 is further configured to send a second update answer message to the PCEF, where the second update answer message carries the first control and charging policy such that after receiving the second update answer message, the PCEF executes the first control and charging policy on the UE.

The following uses a specific application scenario for description.

In an offline charging process, if the PCEF restores the UE from offline charging to online charging, the PCEF re-obtains a control and charging policy from the network device 13 in order to restore the control and charging policy of the UE. A specific process is as follows.

The receiving unit 1301 receives the second update message sent by the PCEF, and a function of the message is reporting, to the network device 13, an event that the UE is restored to online charging. After the receiving unit 1301 of the network device 13 receives the second update message, the processing unit 1302 restores the second control and charging policy used by the UE during offline charging to the first control and charging policy used during online charging. Then the sending unit 1303 sends the first control and charging policy to the PCEF using the second update answer message, and the PCEF receives the second update answer message sent by the sending unit 1303 in the network device 13 such that the PCEF executes the first control and charging policy on the UE in order to restore the control and charging policy used by the UE during online charging.

It should be noted that, the second update message received by the receiving unit 1301 from the PCEF may be a CCR-U message, or may be another message. This is not limited herein.

It should be noted that, the second update answer message sent by the sending unit 1303 to the PCEF may be a CCA-U message, or may be another message. This is not limited herein.

In a specific implementation, the receiving unit 1301 receives, using the Gx interface for communication with the PCEF, the CCR-U message sent by the PCEF. A parameter value of an Event-Trigger AVP in the CCR-U message is extended such that the extended parameter value is used to indicate an online charging recovery event, and the parameter value is referred to as a second parameter value. The processing unit 1302 restores the control and charging policy of the UE to the first control and charging policy according to the second parameter value in the Event-Trigger AVP in the CCR-U message of the UE.

If the processing unit 1302 adjusts the control and charging policy by reducing QoS of the UE when online charging is switched to offline charging, the processing unit 1302 restores the second control and charging policy of the UE to the first control and charging policy by restoring the QoS of the UE.

Figure 14:
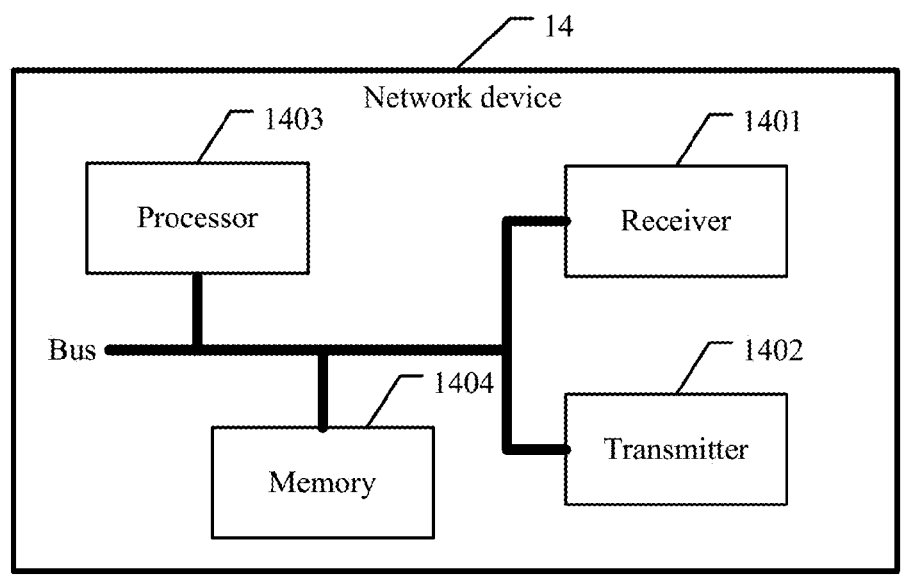
FIG. 14 is a schematic diagram of a hardware structure of a network device according to an embodiment of the present disclosure.

The foregoing describes the network device 10-13 in the embodiments of the present disclosure from the perspective of the modular functional entity, and the following describes a network device in the embodiments of the present disclosure from the perspective of hardware processing. Referring to FIG. 14, a schematic diagram of a hardware structure of a network device 14, according to an embodiment of the present disclosure includes a receiver 1401, a transmitter 1402, a processor 1403, and a memory 1404. There may be one or more processors 1403 in the network device 14, and one processor 1403 is used as an example in FIG. 14. In some embodiments of the present disclosure, the receiver 1401, the transmitter 1402, the processor 1403, and the memory 1404 may be connected using a bus or in another manner. A bus connection is used as an example in FIG. 14.

By invoking an operation instruction stored in the memory 1404, the processor 1403 is configured to perform the following steps of performing online charging for UE, and learning that an OCS is unavailable, switching the UE from online charging to offline charging, and starting an offline timer when the OCS is unavailable, where the offline timer is configured to indicate a maximum time from offline charging to deactivation for the UE, and restoring, by the PCEF, the UE from offline charging to online charging if the PCEF learns, before the offline timer expires, that the OCS becomes available.

In some embodiments of the present disclosure, the processor 1403 is further configured to perform the following steps of setting the transmitter 1402 to send a request message to the OCS, and setting the receiver 1401 to receive a success response message sent by the OCS, where the success response message is a response to the request message, and is used to indicate that the OCS has become available.

In some embodiments of the present disclosure, the processor 1403 is further configured to perform the following steps of setting the transmitter 1402 to send a first update message to a PCRF, where the first update message is used to indicate that the UE has been switched to offline charging, setting the receiver 1401 to receive a first update answer message sent by the PCRF, where the first update answer message carries a second control and charging policy, and the second control and charging policy is a control and charging policy that is of the UE and that is adjusted by the PCRF according to the first update message, executing, by the PCEF, the second control and charging policy on the UE, and executing the second control and charging policy on the UE.

In some embodiments of the present disclosure, the processor 1403 is further configured to perform the following steps of setting the transmitter 1402 to send a second update message to the PCRF, where the second update message is used to indicate that the UE has been restored to online charging, setting the receiver 1401 to receive a second update answer message sent by the PCEF, where the second update answer message carries a first control and charging policy, and the first control and charging policy is a control and charging policy that is of the UE and that is restored by the PCRF according to the second update message, and executing the first control and charging policy on the UE.

In some embodiments of the present disclosure, the processor 1403 is further configured to perform the following steps of learning that a link between the network device 14 and the OCS fails, setting the transmitter 1402 to send the request message to the OCS after perceiving that a failure in the link between the network device 14 and the OCS is rectified, or setting the transmitter 1402 to regularly send the request message to the OCS when the OCS makes no response or setting the receiver 1401 to receive an error code sent by the OCS.

In some embodiments of the present disclosure, the processor 1403 is further configured to perform the following steps of performing charging data record splitting to generate an offline charging data record, where the offline charging data record carries a switched-to-offline flag, and the switched-to-offline flag is used to identify that a BS performs differential charging processing on the offline charging data record, and performing charging data record splitting such that a newly generated offline charging data record no longer carries the switched-to-offline flag after setting the receiver 1401 to receive the success response message sent by the OCS.

In this embodiment of the present disclosure, when the OCS is unavailable, the processor 1403 switches the UE from online charging to offline charging, starts the offline timer, sends the request message to the OCS to attempt to recover online charging, restores the UE from offline charging to online charging before the offline timer expires, if the success response message sent by the OCS is received, it indicates that the OCS has become available. Therefore, according to the solution, after a user is switched to offline charging, an online charging function can be recovered in a timely manner when the OCS becomes available. In this way, a user account overdraft risk possibly existing in an offline charging process is mitigated, and deactivation of the user can be avoided in the solution, thereby improving user experience.

Figure 15:
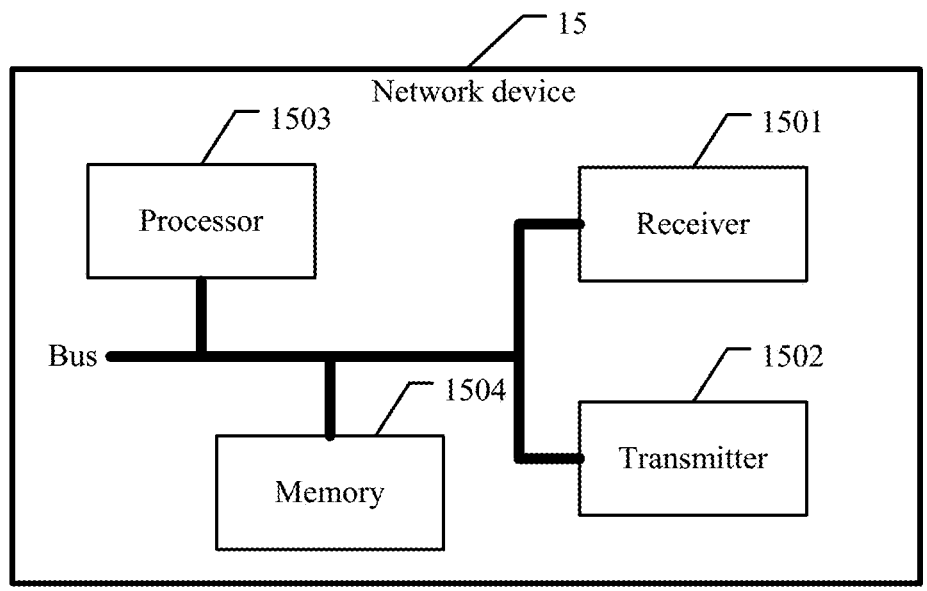
FIG. 15 is a schematic diagram of another hardware structure of a network device according to an embodiment of the present disclosure.

With reference to FIG. 15, a schematic diagram of another hardware structure of a network device 15, according to an embodiment of the present disclosure includes a receiver 1501, a transmitter 1502, a processor 1503, and a memory 1504. There may be one or more processors 1503 in the network device 15, and one processor 1503 is used as an example in FIG. 15. In some embodiments of the present disclosure, the receiver 1501, the transmitter 1502, the processor 1503, and the memory 1504 may be connected using a bus or in another manner. A bus connection is used as an example in FIG. 15.

By invoking an operation instruction stored in the memory 1504, the processor 1503 is configured to perform the following steps of switching UE from online charging to offline charging, setting the transmitter 1502 to send a first update message to a PCRF, where the first update message is used to indicate that the UE has been switched to offline charging, and setting the receiver 1501 to receive a first update answer message sent by the PCRF, where the first update answer message carries a second control and charging policy, and the second control and charging policy is a control and charging policy that is of the UE and that is adjusted by the PCRF according to the first update message, and executing the second control and charging policy on the UE.

In some embodiments of the present disclosure, the processor 1503 is further configured to perform the following steps of setting the transmitter 1502 to send a second update message to the PCRF after the UE is restored from offline charging to online charging, where the second update message is used to indicate that the UE has been restored to online charging, setting the receiver 1501 to receive a second update answer message sent by the PCRF, where the second update answer message carries a first control and charging policy, and the first control and charging policy is a control and charging policy that is of the UE and that is restored by the PCRF according to the second update message, and executing the first control and charging policy on the UE.

In this embodiment of the present disclosure, when online charging is switched to offline charging, the processor 1503 sets the transmitter 1502 to send an update message to the PCRF such that the PCRF adjusts a control and charging policy of the UE according to the message, and sends an adjusted control and charging policy to the processor 1503 in the network device 15, and the processor 1503 executes the adjusted control and charging policy on the UE. In this way, a user account overdraft risk is further mitigated.

Figure 16:
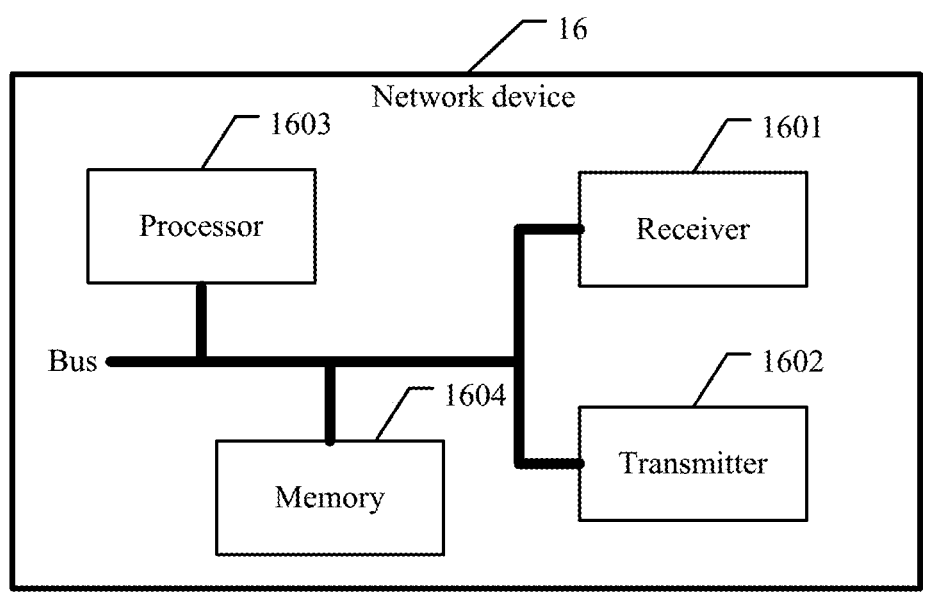
FIG. 16 is a schematic diagram of another hardware structure of a network device according to an embodiment of the present disclosure.

With reference to FIG. 16, a schematic diagram of another hardware structure of a network device 16, according to an embodiment of the present disclosure includes a receiver 1601, a transmitter 1602, a processor 1603, and a memory 1604. There may be one or more processors 1603 in the network device 16, and one processor 1603 is used as an example in FIG. 16. In some embodiments of the present disclosure, the receiver 1601, the transmitter 1602, the processor 1603, and the memory 1604 may be connected using a bus or in another manner. A bus connection is used as an example in FIG. 16.

By invoking an operation instruction stored in the memory 1604, the processor 1603 is configured to perform the following steps of setting the receiver 1601 to receive a first update message sent by a PCEF, adjusting a first control and charging policy of UE to a second control and charging policy according to the received first update message, and setting the transmitter 1602 to send a first update answer message to the PCEF, where the first update answer message carries the second control and charging policy such that after receiving the first update answer message, the PCEF executes the second control and charging policy on the UE.

In some embodiments of the present disclosure, the processor 1603 is further configured to perform the following steps of setting the receiver 1601 to receive a second update message sent by the PCEF after the PCEF restores the UE from offline charging to online charging, restoring the second control and charging policy of the UE to the first control and charging policy according to the received second update message, and setting the transmitter 1602 to send a second update answer message to the PCEF, where the second update answer message carries the first control and charging policy such that after receiving the second update answer message, the PCEF executes the first control and charging policy on the UE.

In this embodiment of the present disclosure, the processor 1603 sets the receiver 1601 to receive an update message sent by the PCEF, the processor 1603 adjusts a control and charging policy of the UE according to the update message and then sends an adjusted control and charging policy to the PCEF using the transmitter 1602, and the PCEF executes the adjusted control and charging policy on the UE such that a user account overdraft risk can be mitigated.

Figure 17:
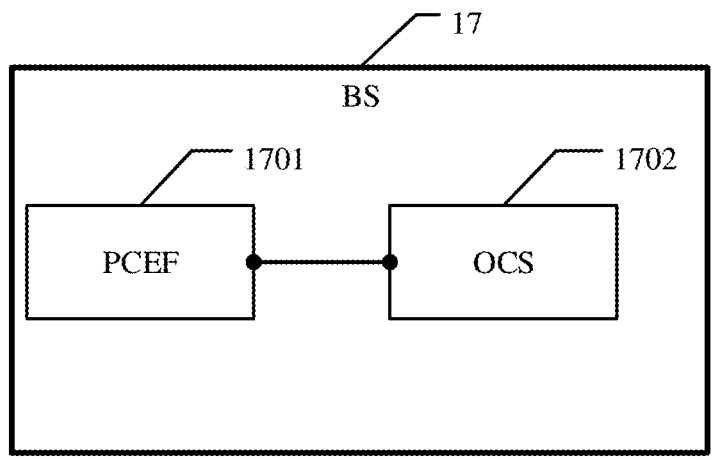
FIG. 17 is a schematic diagram of an embodiment of a BS according to an embodiment of the present disclosure.

The foregoing describes the network device 14-16 in the embodiments of the present disclosure, and the following describes a BS in an embodiment of the present disclosure. Referring to FIG. 17, a schematic diagram of an embodiment of BS 17 includes a PCEF 1701 and an OCS 1702.

The PCEF 1701 is configured to perform online charging for UE, switch the UE from online charging to offline charging, and start an offline timer after learning that the OCS 1702 is unavailable, where the offline timer is configured to indicate a maximum time from offline charging to deactivation for the UE, and restore the UE from offline charging to online charging if the PCEF 1701 learns, before the offline timer expires, that the OCS 1702 becomes available.

It should be noted that, the PCEF is located at a gateway, and may be a GGSN in a GPRS network in actual application.

In this embodiment of the present disclosure, the BS 17 includes the PCEF 1701 and the OCS 1702, when learning that the OCS 1702 is unavailable, the PCEF 1701 switches the UE from online charging to offline charging, and starts the offline timer, and restores the UE from offline charging to online charging if it is learned, before the offline timer expires, that the OCS 1702 becomes available. Therefore, according to the solution, after a user is switched to offline charging, an online charging function can be recovered in a timely manner when the OCS 1702 becomes available. In this way, a user account overdraft risk possibly existing in an offline charging process is mitigated, and deactivation of the user can be avoided in the solution, thereby improving user experience.

Figure 18:
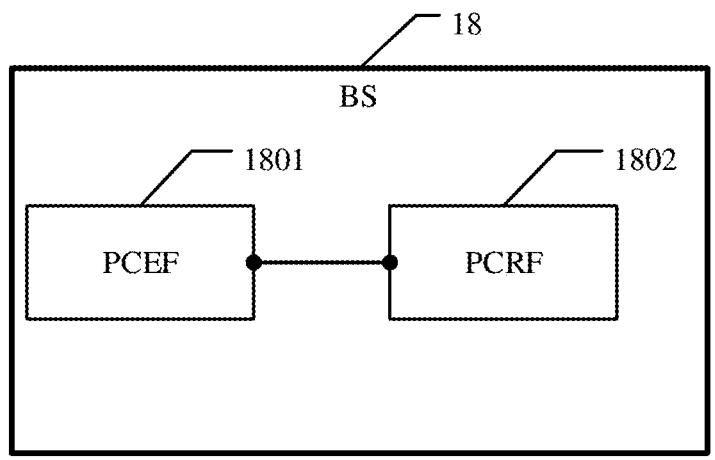
FIG. 18 is a schematic diagram of another embodiment of a BS according to an embodiment of the present disclosure.

Referring to FIG. 18, a schematic diagram of another embodiment of BS 18 includes a PCEF 1801 and a PCRF 1802.

The PCEF 1801 is configured to switch UE from online charging to offline charging, and send a first update message to the PCRF 1802.

The PCRF 1802 is configured to receive the first update message sent by the PCEF 1801, adjust a first control and charging policy of the UE to a second control and charging policy according to the first update message, and then send a first update answer message to the PCEF 1801, where the first update answer message carries the second control and charging policy.

The PCEF 1801 is further configured to receive the first update answer message sent by the PCRF 1802, and execute the second control and charging policy on the UE.

In this embodiment of the present disclosure, the BS 18 includes the PCEF 1801 and the PCRF 1802, when online charging is switched to offline charging, the PCEF 1801 sends an update message to the PCRF 1802 such that the PCRF 1802 adjusts a control and charging policy of the UE according to the message, and sends an adjusted control and charging policy to the PCEF 1801, the PCEF 1801 executes the adjusted control and charging policy on the UE. In this way, a user account overdraft risk is further mitigated.

In the foregoing embodiments, the description of each embodiment has respective focuses. For a part that is not described in detail in an embodiment, refer to related descriptions in other embodiments.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the other approaches, or all or some of the technical solutions may be implemented in a form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The charging method and apparatus provided in the present disclosure are described in detail above. The principle and implementation of the present disclosure are described in this specification using specific examples. The description about the embodiments is merely provided to help understand the method and core ideas of the present disclosure. In addition, a person of ordinary skill in the art can make modifications to the present disclosure in terms of the specific implementations and application scopes according to the ideas of the present disclosure. In conclusion, the content of this specification shall not be construed as a limitation on the present disclosure.

What is claimed is:

1. A charging method, comprising:
performing, by a policy and charging enforcement function (PCEF), online charging for a user equipment (UE);
learning, by the PCEF, that an online charging system (OCS) is unavailable;
switching, by the PCEF, the UE from online charging to offline charging;
starting, by the PCEF, an offline timer indicating a maximum time from offline charging to deactivation for the UE;
sending, by the PCEF, a first update message to a policy and charging rules function (PCRF), wherein the first update message indicates that the UE has been switched to the offline charging;
receiving, by the PCEF, a first update answer message from the PCRF, wherein the first update answer message carries a second control and charging policy, and wherein the second control and charging policy comprises a control and charging policy of the UE adjusted by the PCRF according to the first update message;
executing, by the PCEF, the second control and charging policy on the UE during offline charging; and
restoring, by the PCEF, the UE from offline charging to online charging when the PCEF learns that the OCS becomes available before the offline timer expires.

2. The method according to claim 1, wherein the first update message comprises a first Event-Trigger attribute-value pair (AVP), wherein the first Event-Trigger AVP comprises a first parameter value, and wherein the first parameter value indicates that the UE has been switched to the offline charging.

3. The method according to claim 1, further comprising:
sending, by the PCEF, a second update message to the PCRF after the PCEF restores the UE from the offline charging to the online charging, wherein the second update message indicates that the UE has been restored to the online charging;
receiving, by the PCEF, a second update answer message from the PCRF, wherein the second update answer message carries a first control and charging policy, and wherein the first control and charging policy comprises a control and charging policy of the UE restored by the PCRF according to the second update message; and
executing, by the PCEF, the first control and charging policy on the UE.

4. The method according to claim 3, wherein the second update message comprises a second Event-Trigger attribute-value pair (AVP), wherein the second Event-Trigger AVP comprises a second parameter value, and wherein the second parameter value indicates that the UE has been restored to the online charging.

5. The method according to claim 3, wherein quality of service (QoS) in the second control and charging policy is lower than QoS in the first control and charging policy.

6. A network device, comprising:
one or more processors; and
at least one non-transitory computer-readable memory storing a program to be executed by the one or more processors, wherein the program comprises instructions that when executed by the one or more processors cause the network device to execute operations comprising:
performing online charging for a user equipment (UE);
learning that an online charging system (OCS) is unavailable;
switching the UE from online charging to offline charging;
starting an offline timer indicating a maximum time from offline charging to deactivation for the UE;
sending a first update message to a policy and charging rules function (PCRF), wherein the first update message indicates that the UE has been switched to the offline charging;
receiving a first update answer message from the PCRF, wherein the first update answer message carries a second control and charging policy, and wherein the second control and charging policy comprises a control and charging policy of the UE adjusted by the PCRF according to the first update message;
executing the second control and charging policy on the UE during offline charging; and
restoring the UE from offline charging to online charging when the network device learns that the OCS becomes available before the offline timer expires.

7. The network device according to claim 6, wherein the first update message comprises a first Event-Trigger attribute-value pair (AVP), wherein the first Event-Trigger AVP comprises a first parameter value, and wherein the first parameter value indicates that the UE has been switched to the offline charging.

8. The network device according to claim 6, wherein the operations further comprise:
sending a second update message to the PCRF after the UE is restored from the offline charging to the online charging, wherein the second update message indicates that the UE has been restored to the online charging;
receiving a second update answer message from the PCRF, wherein the second update answer message carries a first control and charging policy, and wherein the first control and charging policy comprises a control and charging policy of the UE restored by the PCRF according to the second update message; and
executing the first control and charging policy on the UE.

9. The network device according to claim 8, wherein the second update message comprises a second Event-Trigger attribute-value pair (AVP) comprising a second parameter value, and wherein the second parameter value indicates that the UE has been restored to the online charging.

10. The network device according to claim 6, wherein quality of service (QoS) in the second control and charging policy is lower than QoS in the first control and charging policy.

* * * * *